US007350156B2

(12) United States Patent
Kohyama et al.

(10) Patent No.: US 7,350,156 B2
(45) Date of Patent: Mar. 25, 2008

(54) AUDIO SIGNAL EDITING APPARATUS AND CONTROL METHOD THEREFOR

(75) Inventors: Naohide Kohyama, Hamamatsu (JP); Taku Nishikori, Hamamatsu (JP); Hiroshi Hamamatsu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 742 days.

(21) Appl. No.: 10/247,598

(22) Filed: Sep. 19, 2002

(65) Prior Publication Data

US 2003/0059066 A1    Mar. 27, 2003

(30) Foreign Application Priority Data

Sep. 21, 2001  (JP) ............................. 2001-289508
Sep. 21, 2001  (JP) ............................. 2001-289509

(51) Int. Cl.
*G06F 3/00* (2006.01)
(52) U.S. Cl. ...................... 715/804; 715/790; 715/791; 715/796
(58) Field of Classification Search ................ 715/804, 715/790, 791, 796
See application file for complete search history.

(56) References Cited

U.S. PATENT DOCUMENTS

| 5,054,077 | A |   | 10/1991 | Suzuki |  |
|---|---|---|---|---|---|
| 5,060,272 | A |   | 10/1991 | Suzuki |  |
| 5,239,458 | A |   | 8/1993 | Suzuki |  |
| 5,386,504 | A | * | 1/1995 | Yoda et al. ................ | 715/798 |
| 5,386,552 | A | * | 1/1995 | Garney ........................ | 714/10 |
| 5,438,661 | A | * | 8/1995 | Ogawa ........................ | 715/804 |
| 5,671,379 | A | * | 9/1997 | Kuse et al. .................. | 715/805 |
| 5,712,737 | A | * | 1/1998 | Tsubaki et al. .............. | 360/13 |
| 5,797,003 | A | * | 8/1998 | Voce ............................ | 713/2 |
| 5,805,162 | A | * | 9/1998 | Imai et al. ................... | 715/788 |
| 5,892,511 | A | * | 4/1999 | Gelsinger et al. ........... | 715/794 |
| 5,900,859 | A | * | 5/1999 | Takishita et al. ........... | 345/629 |
| 6,005,575 | A | * | 12/1999 | Colleran et al. ............ | 715/807 |
| 6,031,530 | A | * | 2/2000 | Trueblood ................... | 715/791 |
| 6,088,481 | A | * | 7/2000 | Okamoto et al. ........... | 382/189 |
| 6,522,999 | B2 | * | 2/2003 | Fuji ............................. | 704/2 |
| 6,750,858 | B1 | * | 6/2004 | Rosenstein ................. | 715/790 |
| 6,876,819 | B2 | * | 4/2005 | Sawada et al. .............. | 399/9 |
| 6,957,395 | B1 | * | 10/2005 | Jobs et al. .................. | 715/765 |

FOREIGN PATENT DOCUMENTS

JP    3-121800    12/1991

(Continued)

*Primary Examiner*—Kieu D. Vu
(74) *Attorney, Agent, or Firm*—Morrison & Foerster LLP

(57) ABSTRACT

Interlocking flag, indicating whether or not an interlocked display should be made, can be set in association with predetermined editing operators. When any of the operators is operated, a displayed screen on a display is switched over to a screen related to the operated operator, if the interlocking flag associated with the operated operator indicates flag-ON; if not, the display device may be used to perform another function. A plurality n of channels may be divided into a plurality of layers each consisting of predetermined number m channels. It is only necessary that a limited number of operators, e.g. faders, be provided to correspond to a single layer, i.e. m channels. Any of the layers is selected, and any of the operators is used for the selected layer. A set of stereo channels can be set across different layers so as to interlock with each other in response to editing operation of the operator.

9 Claims, 15 Drawing Sheets

FOREIGN PATENT DOCUMENTS

| | | |
|---|---|---|
| JP | 4-124728 | 11/1992 |
| JP | 7-015257 | 1/1995 |
| JP | 8-130427 | 5/1996 |
| JP | 10-145159 | 5/1998 |
| JP | 11-101654 | 4/1999 |
| WO | WO-00/65571 | 11/2000 |

* cited by examiner

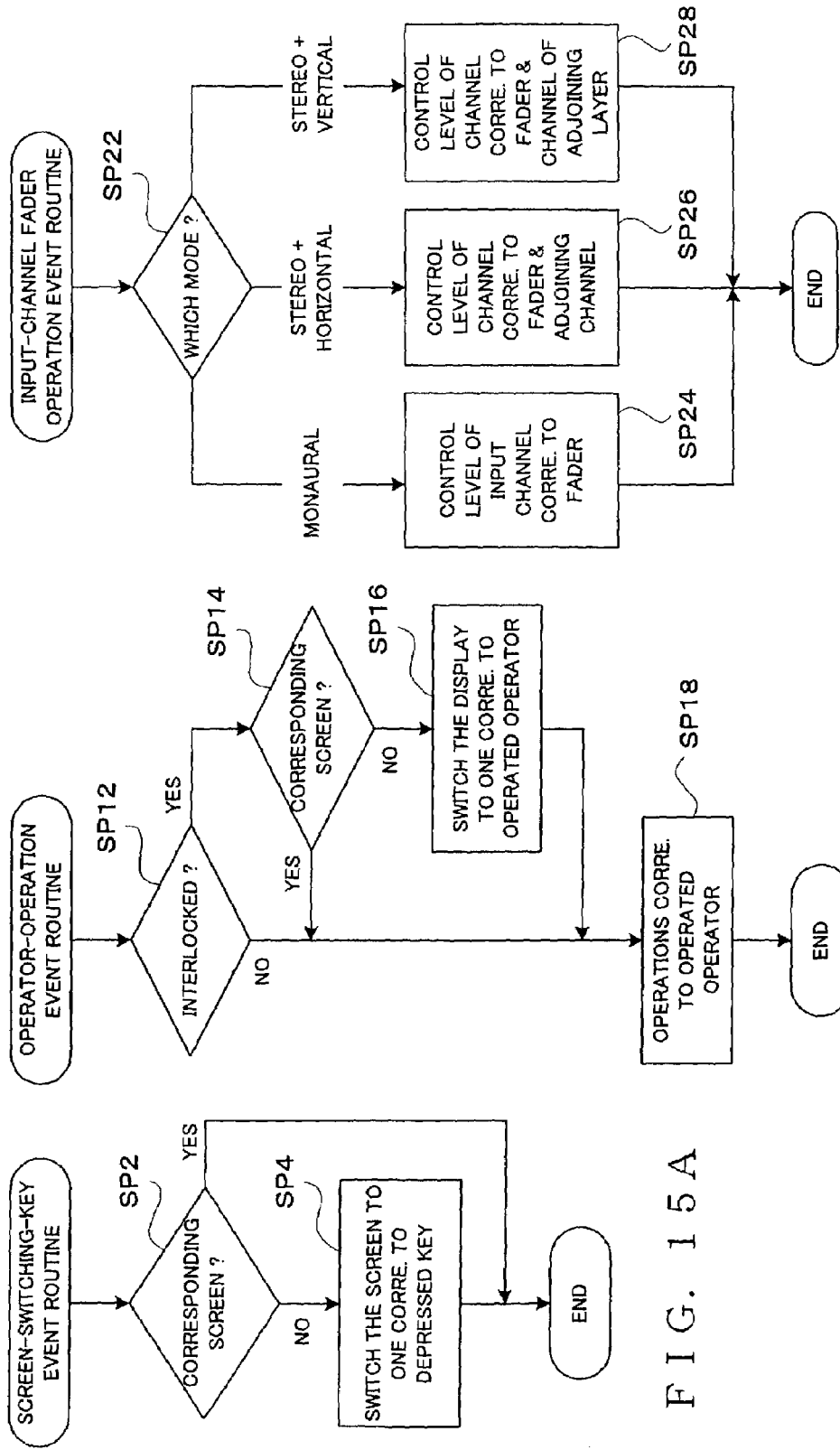

ABSTRACT: # AUDIO SIGNAL EDITING APPARATUS AND CONTROL METHOD THEREFOR

BACKGROUND OF THE INVENTION

The present invention relates to an audio signal editing apparatus suitable for use as an audio mixing console and the like, a control method for controlling the audio signal editing apparatus, and a computer program for performing the control method.

Today's audio mixing consoles are digitized to perform a variety of functions, and human operators are allowed to make various desired settings of the mixing consoles. Providing, on the mixing console, all of operators and displays necessary for performing these functions would greatly increase the overall area of the mixing console and is therefore impractical. Thus, it has been conventional to provide a multi-function display on the mixing console and visually show a variety of settings by switching the functions of the display. However, with the conventional audio mixing consoles, it is necessary for the human operator to set, via switches or the like, contents of information to be shown on the display, which tends to be very troublesome operation.

Further, on the conventional audio mixing consoles, there are provided a plurality of faders to control or adjust the tone volume and the like of audio signals of a plurality of channels. Increasing the number of such faders may greatly enhance the operability to adjust the tone volume and the like of many channels, but it will also increase the overall size and cost of the mixing console. A variety of audio signals may be input to and processed by the audio mixing console; in many cases, audio signals of a set of channels (normally, two channels), having already been edited as stereophonic audio signals, are also input to and processed by the audio mixing console.

Regarding audio signals of such a set of channels, it is desirable that parameters, such as operating amounts of corresponding faders (hereinafter referred to as "fading amounts"), be related or coupled to each other (i.e., interlocked between the channels). Thus, in the art, there has been known a technique which, when the fading amount or the like of any one of channels constituting a particular channel set has been changed, causes the fading amount or the like of the other channel of the particular channel set to be changed in conformity with the changed fading amount or the like of the one channel. In this case, the faders are in the form of electric faders, whose operating positions are caused to automatically follow specific fading amounts to be set. However, with the known technique, some of the faders do nothing more than following the other faders, which would result in significant wastes of some of the limited number of faders and other operators and circuits associated therewith.

SUMMARY OF THE INVENTION

In view of the foregoing, it is an object of the present invention to provide an improved audio signal editing apparatus, a control method for controlling the audio signal editing apparatus and a computer program for performing the control method which allow displayed contents of a display device to be automatically set in accordance with a manner of operation by a human operator.

It is another object of the present invention to provide an improved audio signal editing apparatus and method and a computer program for performing the method which allow operators, such as faders, to be used with increased efficiency.

According to one aspect of the present invention, there is provided an audio signal editing apparatus including a display device and one or more editing operators, which comprises: a processor coupled with said display device and editing operators, said processor adapted to: set, in association with predetermined one or more of said one or more editing operators, interlocking information indicating whether or not an interlocked display, responsive to operation of any of the predetermined editing operators, should be made on said display device; and when any of said operators has been operated, switch a displayed screen on said display device over to a screen related to the operated operator, on condition that the interlocking information associated with the operated operator indicates that the interlocked display should be made.

Where the interlocking information is set such that the interlocked display is to be made on the display device, and when any of the one or more editing operators has been operated for editing, the displayed screen on the display device is automatically switched over to a predetermined screen related to the operated operator. With this arrangement, it is not necessary for the human operator to perform particular manual operation for switching the displayed screen on the display device, and thus even where the audio signal editing apparatus, i.e. mixing console, is complicated in construction and difficult to manipulate, the human operator can use or manipulate the editing apparatus with utmost ease. Further, with the setting of the interlocking information, the use of the interlocked display function can be selected separately for each of the operators; thus, regarding those operators for which the interlocked display function need not be used, the display screen of the display device can be used for other desired purposes, which thereby achieves efficient use of the display device.

According another aspect of the present invention, there is provided an audio signal editing apparatus capable of editing audio signals of a set of channels selected from among a plurality n of channels, which comprises: an operator device operable to perform editing operation; and a processor coupled with said operator device, said processor adapted to: select one of first and second combining modes; determine a set of channels including k-th and (k+1)th channels (where $1 \leq k$ and $k+1 \leq n$) when said first combining mode is selected, but determine a set of channels including k-th and (k+m)th channels (where $1 \leq k$ and $k+m \leq n$, and m is a predetermined number greater than 2 but smaller than n) when said second combining mode is selected; and interlock editing parameters between the channels of the determined set of channels.

When audio signals of a plurality of channels are to be combined, like in a stereo mode, and then edited in accordance with editing parameters interconnected between the channels, the aforementioned arrangements can greatly diversify the combination of audio signals.

According still another aspect of the present invention, there is provided an audio signal editing apparatus capable of editing audio signals of a set of channels selected from among a plurality n of channels, the n channels being divided into a plurality of layers, each of the layers consisting of a predetermined number m (where m<n) of channels. The audio signal editing apparatus comprises: a display device capable of displaying a display screen for use of editing a selected one of said layers: an operator device operable to perform editing operation on audio signals of the m channels, belonging to the selected one of said layers, on a channel-by-channel basis; and a processor coupled with said display device and operator device, said processor adapted to: select any one of the plurality of layers; and perform editing, interlocked with the editing operation performed via said operator device, on an audio signal of a p-th channel belonging to another layer which is previously defined to constitute a pair with a k-th channel belonging to the selected layer.

When audio signals of a plurality of channels are to be combined, like in a stereo mode, and then edited in accordance with editing parameters interconnected between the channels, the aforementioned arrangements can greatly diversify the combination of audio signals. Further, in this case, it is only necessary that a limited number of operators be provided for just allowing editing operation on audio signals of m channels belonging to one layer, and thus the invention can greatly simplify the construction. Therefore, the present invention can edit/control audio signals of a greater number of channels making effective use of a smaller number of operators such as faders.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

Figures 10A, 10B:
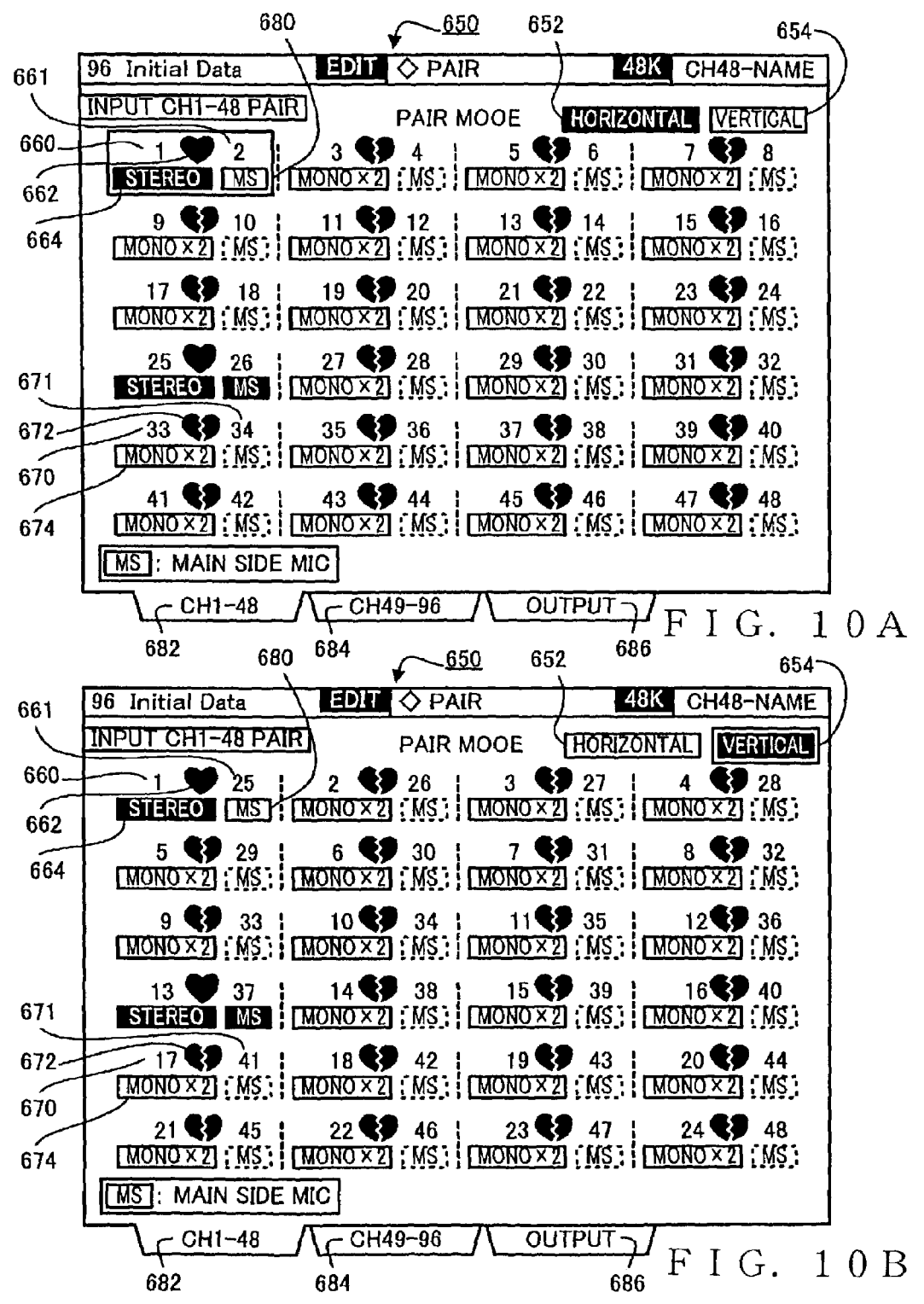

FIGS. 10A and 10B are diagrams showing examples of channel-pair setting screens displayed on the display device of FIG. 1;

FIGS. 15A, 15B and 15C are flow charts explanatory of control programs executed in the embodiment.

DETAILED DESCRIPTION OF THE EMBODIMENTS

Figure 1:
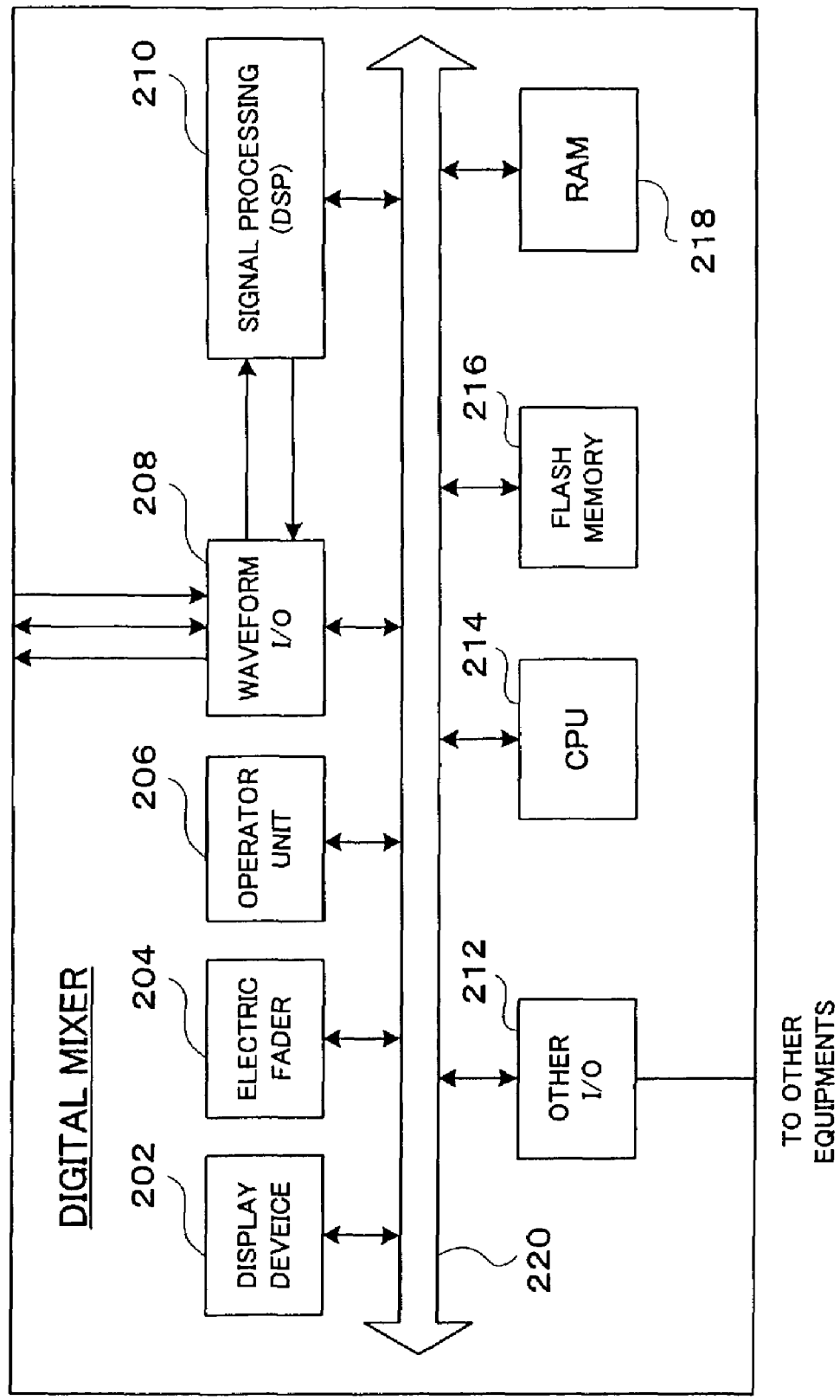
FIG. 1 is a block diagram showing a general setup of an audio mixing console in accordance with an embodiment of the present invention.

Control method according to a first aspect of the present invention, which will be described in detail below in relation to embodiments of the invention, may be summarized as follows. The control method of the present invention is directed to controlling an audio signal editing apparatus including operators to be used for setting parameters of audio signals and a display device. The control method of the present invention comprises: a step of storing interlocking information (interlocking flags) in a storage section in association with the operators; a step of detecting activation or operation of any one of the operators; a step of switching the displayed screen on the display device over to a predetermined screen related to the operated operator on condition that the interlocking information is indicative of a predetermined value (e.g., "1"), and a step of keeping the current displayed screen on the display device unchanged, irrespective of the operation of the operator, on condition that the interlocking information is indicative of another value than the predetermined value. The control method according to the first aspect of the present invention will be later explained in detail in relation to, for example, FIGS. 9 and 15.

Typically, in the control method according to the first aspect of the present invention, the audio signal editing apparatus includes a plurality of groups of operators, and the storage section stores a separate piece of the interlocking information for each of the operator groups. In such a case, the control method may further comprise a step of displaying the interlocking information on the display device, and a step of editing the interlocking information as necessary. Such features are also clearly seen in, for example, FIG. 9.

Further, in the control method of the present invention, the audio signal editing apparatus includes at least one display instructing operator for each of the operator groups. The control method may further includes a step of, when operation of any one of the display instructing operators has been detected, displaying a predetermined screen corresponding to the operated display instructing operator, irrespective of contents of the interlocking information. This feature is clearly seen in, for example, FIGS. 5, 6 and 7.

Editing method according to a second aspect of the present invention, which will be described in detail below in relation to embodiments of the invention, may be summarized as follows. The audio signal editing method of the present invention is directed to editing audio signals of a set of channels, selected from among a plurality n of channels, while interrelating or interlocking audio editing parameters (such as fading amounts, equalizer settings and compressor settings) between the channels of that set as necessary. The audio signal editing method of the present invention comprises: a selection step of selecting one of first (horizontal) and second (vertical) combining modes; a selection step of selecting one of first and second combining modes; a step of determining a set of channels including k-th and (k+1)th channels (where 1≦k and k+1≦n) when the first (horizontal) combining mode is selected by the selection step, but determining a set of channels including k-th and (k+m)th channels (where 1≦k and k+m≦n, and m is a predetermined number greater than 2 but smaller than n) when the second (vertical) combining mode is selected by the selection step; and a step of interlocking editing parameters between the audio signals of the determined set of channels. These features are shown in detail in, for example, FIGS. 10A, 10B, 15C, etc.

The audio signal editing method according to the second aspect of the present invention may further comprise a step of setting either a stereo mode or a monaural mode for the audio signals of the set of channels, and a step of interrelating or interlocking the editing parameters between the channels on condition that the stereo mode has been set for the audio signals of the set of channels.

Editing method according to a third aspect of the present invention, which will be described in detail below in relation to embodiments of the invention, may be summarized as follows. The audio signal editing method of the present invention is directed to editing audio signals of a set of channels selected from among a plurality n of channels, the n channels being divided into a plurality of layers, each of the layers consisting of a predetermined number m (where m<n) of channels, while interlocking audio editing parameters (such as fading amounts, equalizer settings and compressor settings), as necessary, between the selected channels. The audio signal editing method comprises: a step of selecting any one of the plurality of layers; a step of setting audio editing parameters (such as fading amounts, equalizer settings and compressor settings) for audio signals of the m channels belonging to the selected layer by use of m operators (e.g., faders); and a step of, on the basis of audio editing parameters of a k-th channel belonging to the selected layer and previously set to the stereo mode, setting audio editing parameters of a p-th channel which belongs to another layer than the selected layer and has a predetermined relationship with the k-th channel. Such features of the method are shown and described in relation to, for example, FIGS. 8 and 15C.

In the method according to the third aspect of the present invention, the channel number p of the p-th channel may have a relationship "p=m+k" with respect to the channel number k of the k-th channel. The method may further include a step of displaying levels of audio signals of m channels, corresponding to the m operators, on m displays, each capable of displaying levels of audio signals of two channels, that are provided in corresponding relation to the m operators, and causing one of the displays, which is displaying a level of the audio signal of the k-th channel, to also displays a level of the audio signal of the p-th channel.

1. Construction of Embodiment 1.1. General Setup:

Now, a general setup of an audio mixing console in accordance with an embodiment of the present invention will be described with reference to FIG. 1. In the audio mixing console of FIG. 1, a display device 202 displays various information to a human operator on the basis of display information supplied via a bus 220. When any one of electric faders 204 is operated by the human operator, it outputs its current operational position via the bus 220 and is driven in accordance with setting information supplied via the bus 220, so that a fading position of the operated fader 204 is automatically set. Operator unit 206 is provided for the human operator to set tone color parameters, such as filter characteristics, monitoring position, contents to be displayed on the display device 202, etc.

Waveform I/O section 208 is provided for inputting and outputting analog and/or digital signals to and from the mixing console. In the instant embodiment, all processes, such as a mixing process and effect process, of various audio signals are performed in a digital manner. However, many of audio signals to be input from outside the mixing console and to be output to the outside are analog signals. Thus, any of memory cards having various functions, such as a microphone-level analog input function, line-level analog input function, digital input function, analog output function and digital output function, is inserted in the waveform I/O section 208, as necessary, and the inserted card permits any necessary conversion process.

The mixing console also includes a signal processing section 210 that is composed of a group of DSPs (Digital Signal Processors). The signal processing section 210 performs the mixing process and effect process, etc. on a digital audio signal supplied via the waveform I/O section 208, and it outputs the processed result to the waveform I/O section 208. Other I/O section 212 inputs and outputs information from and to any of various other apparatus. The mixing console of the invention also includes a CPU 214 that controls various components of the mixing console via the bus 220 on the basis of various control programs as will be later described. Flash memory 216 stores therein the control programs and setting information for the mixing console. Reference numeral 218 represents a RAM that is used as a working memory for the CPU 214.

Figure 2:
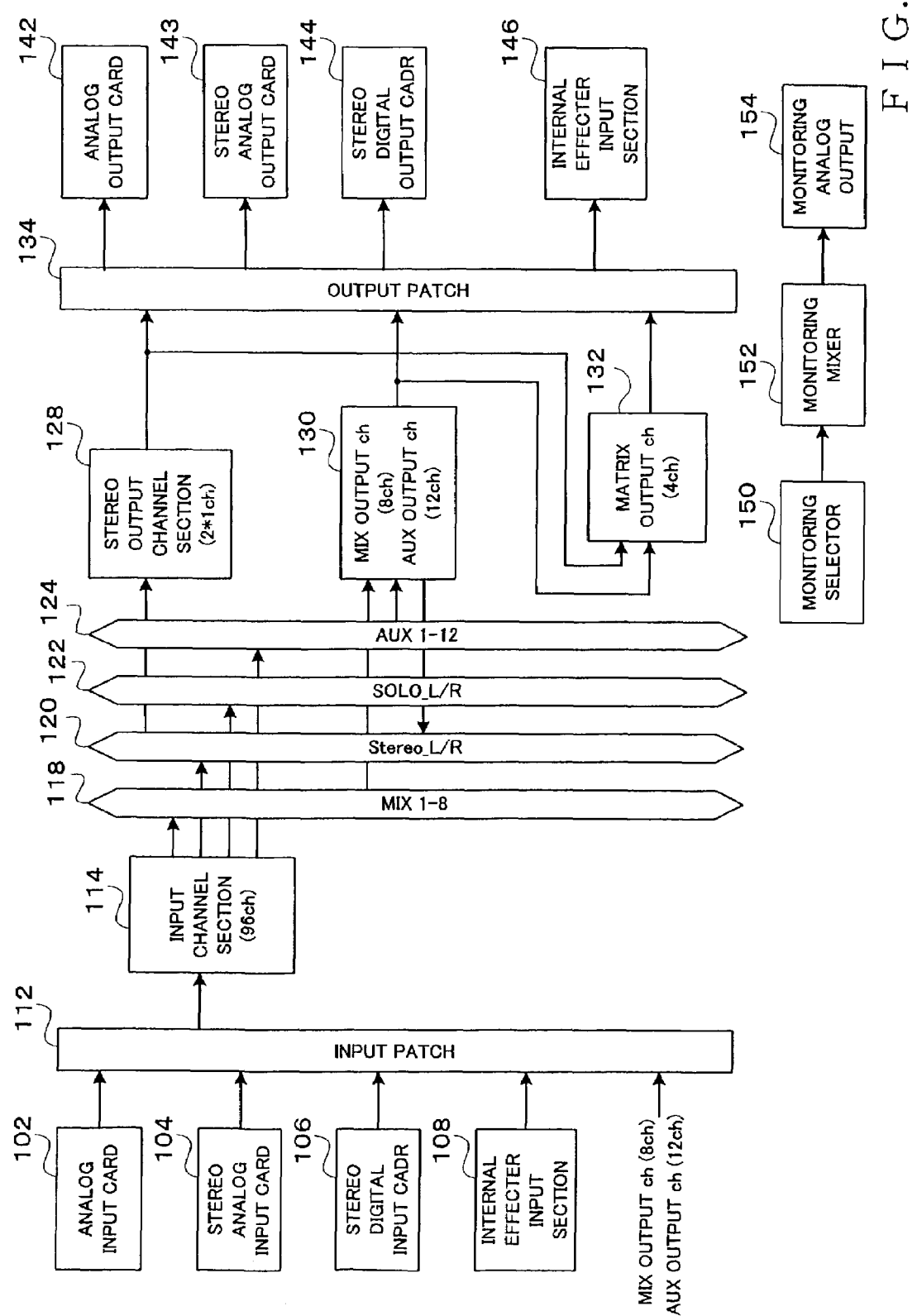
FIG. 2 is a block diagram showing algorithms to be implemented by a signal processing section of FIG. 1.

1.2. Algorithms to be Implemented in Signal Processing Section 210 etc.:

This and following paragraphs describe contents of algorithms to be implemented in the signal processing section 210 etc., with reference to FIG. 2. In the illustrated example, reference numerals 102-106 and 142-144 represent an analog input section, digital input section, analog output section and digital output section, respectively, provided in the waveform I/O section 208, which comprise built-in hardware and add-in cards. Specifically, 102 represents the analog input section, having 24 channels (the number of the channels is expandable by insertion of an add-in card), which, upon receipt of an analog audio signal, converts the received signal into a digital audio signal and outputs the converted digital audio signal to the signal processing section 210. 104 represents the stereo analog input section (stereo L/R (Left/Right) channel×2 ch), which, upon receipt of stereo analog audio signals, converts the received signals into digital audio signals and outputs the converted digital audio signals to the signal processing section 210. 106 represents the digital input section (stereo L/R channel×3 ch; the number of the channels is expandable by insertion of an add-in card), which, upon receipt of stereo digital audio signals, converts the received signals into a particular format processable in the signal processing section 210 (hereinafter called an "internally processable format").

142 represents the analog output section, having 8 channels (the number of the channels is expandable by insertion of an add-in card), which converts a digital audio signal, supplied from the signal processing section 210, into an analog audio signal and transmits the converted signal to outside the mixing console. 143 represents the stereo analog output section (stereo L/R channel 1 ch) which converts digital audio signals of two channels, into two-channel stereo analog audio signals and transmits the converted signals to outside the mixing console. Further, 144 represents the digital output section which converts a digital audio signal of the internally processable format, supplied from the signal processing section 210, into a digital audio signal of a predetermined format, such as AES/EBU, ADAT or TASCAM (all of these are trademarks).

Whereas the above-described construction is implemented in the instant embodiment by the waveform I/O section 208 and various input and output sections that are hardware components separate from the signal processing section 210, other construction than the above-described is implemented in the instant embodiment by software programs executed by the signal processing section 210. The mixing console of the invention further includes an eight-block effecter unit, consisting of eight blocks of effecter, provided therein, and reference numerals 108 and 146 represent an internal effecter output section and internal effecter input section, respectively. In the eight-block effecter unit, up to eight blocks of effect processes can be performed on input audio signals of up to 16 channels, so that audio signals of 16 channels at the maximum can be output from the effecter unit. Here, the number of input/output to/from each of the effecter blocks varies depending on contents of the effect process to be performed in that effecter block. Further, the mixing console of the invention has eight plug-in slots for adding extra effecters as desired.

The mixing console of the invention further includes an input channel section 114, which performs, on an input audio signal of each of channels (96 channels at the maximum), signal processing, such as limiter, gate, compressor, equalizer processes, and input channel processing, such as fader-based tone volume control and panning-based localization control, and then outputs the thus-processed audio signal to a destination designated through a routing process. Here, the routing process can designate, as a destination, any one or more of MIX buses, stereo buses and AUX buses as will be later described. Reference numeral 112 represents an input patch section, which allocates a digital audio signal, supplied from any one of the input sections 102, 104 and 106, to a desired one of the channels of the input channel section 114. The input patch section 112 is also supplied with an audio signal from the internal effecter output section 108, and the input patch section 112 can deliver the thus-supplied audio signal to the input channel section 114.

Reference numeral 118 represents a MIX bus unit composed of eight MIX buses, which mixes together digital audio signals of the individual MIX buses. Here, to each of the MIX buses is supplied a digital audio signal of one of the 96 channels of the input channel section 114 for which the MIX bus in question is designated by the routing process as a destination. Reference numeral 130 represents a unit of MIX output channel and AUX output channel sections. The MIX output channel section has eight output channels corresponding to the eight MIX buses, and the AUX output channel section has twelve AUX output channels corresponding to twelve AUX buses. In each of the output channels, signal processing such as limiter, compressor, equalizer processes and input channel processing such as fader-based tone volume control are performed on an input audio signal, so as to output the thus-processed audio signal. The eight MIX output channels and twelve AUX output channels are supplied with mixed results MIX1 to MIX8 and mixed results AUX1 to AUX12, respectively. The audio signal thus supplied to each of the MIX and AUX output channels is subjected to an output channel process, and the resultant processed audio signal is delivered to both of an output patch section 134 and a matrix output channel section 132. Further, an audio signal output from the MIX output channel section can also be delivered to a stereo bus 120.

The stereo bus 120 has a set of left (L) and right (R) buses, which mixes digital audio signals supplied from the input channel section 114 and MIX output channel section. Mixed results of the L and R channels are supplied from the stereo bus 120 to a stereo output channel section 128 having two channels, i.e. L and R channels. The audio signals of the L and R channels are delivered to both of the output patch section 134 and matrix output channel section 132. Output signals from the stereo output channel section 128 are used primarily as audio signals to be sounded toward all audience seats. Further, in each of the input channels, an audio signal having been subjected to tone volume adjustment via the electric fader 204 can be subjected to further tone volume adjustment corresponding to any one of the twelve AUX buses which has been designated as a destination. Each of the AUX buses mixes tone-volume-adjusted audio signals of one or more input channels having been supplied from the input channel section 114 to that AUX bus, and then it outputs the mixed result to corresponding AUX channel.

Output signals from the AUX output channels of the MIX output channel and AUX output channel section unit 130 can be used for echo-back to performers on the stage, recording and various other purposes. Reference numeral 122 represents an SOLO bus that is used primarily for monitoring. In each of the input channels, there is provided switches for setting whether or not a digital audio signal should be supplied to the SOLO bus 122 and for, if the digital audio signal is set be supplied to the SOLO bus 122, switching between post-fade and pre-fade modes. Digital audio signals of the individual input channels are mixed via the SOLO bus 122 in accordance with current operational states of these switches.

The matrix output channel section 132 further mixes output signals from the stereo output channel section 128 and MIX output channel and AUX output channel section unit 130, and it outputs the resultant mixed results after performing an output channel process on the mixed results. Namely, the audio signals having been mixed and subjected to the output channel process by the matrix output channel section 132 are supplied to the output patch section 134.

The output patch section 134 allocates the individual digital audio signals, output from the stereo output channel section 128, and MIX output channel section 130 or matrix output channel section 132, to one or more desired locations of the output sections 142, 143 and 144. Further, of these digital audio signals, each audio signal to be transmitted to the internal effecter input section 146 is allocated to a desired input terminal of the effecter input section 146.

Reference numeral 150 represents a monitoring selector that selects one or more of the audio signals output present in the above-described components. 152 represents a monitoring mixer that mixes the audio signals selected by the monitoring selector 150. Further, 154 represents a monitoring audio output section that converts the resultant mixed signal, output from the monitoring mixer, into an analog audio signal.

Figure 3:
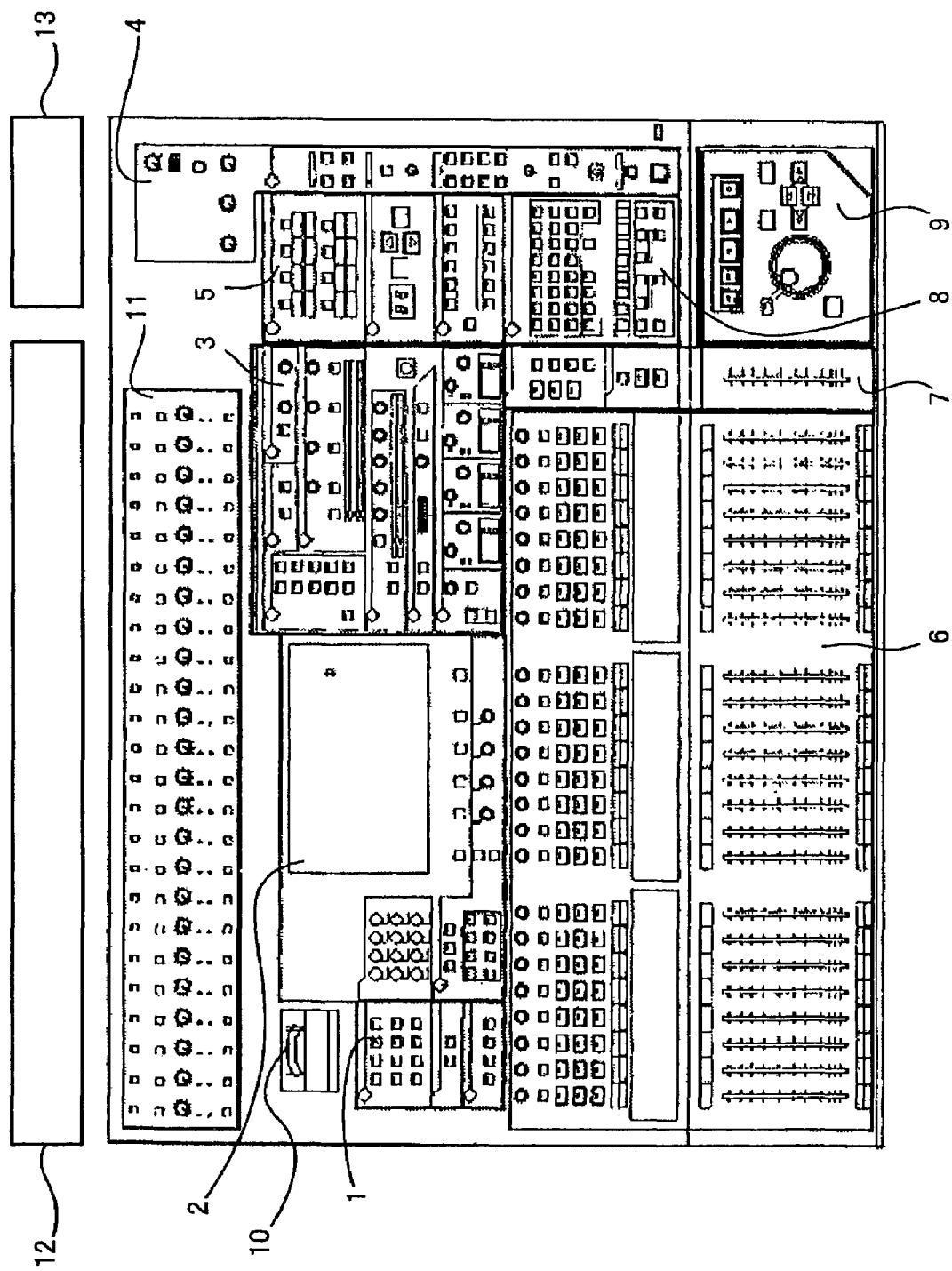
FIG. 3 is a plan view showing an operation panel employed in the embodiment of the audio mixing console.

1.3. Construction of Operation Panel:

1.3.1 General Setup:

This and following paragraphs describe a general setup of an operation panel of the audio mixing console, with reference to FIG. 3. In FIG. 3, the operation panel includes a fader mode section 1 that sets a desired function and the like of the electric faders 204. Further, the operation panel also includes a display control section 2 that includes various operators for controlling the display device 202. Reference numeral 3 represents a selected channel section that includes various operators and displays to be used for setting specific parameters for a desired channel selected by channel selection keys (channel SEL keys). The selected channel section 3 also includes a joystick to be used for clicking a desired object and controlling localization when 4-channel, 5.1-channel or other type of mixing is performed.

Further, in FIG. 3, reference numeral 4 represents a monitor section that includes operators and the like to be used for monitoring digital audio signals present in various sections of the mixing console. Reference numeral 5 represents a user-defined key/scene memory/auto. mix section. In the instant embodiment of the mixing console, the human operator can define desired functions of some of the keys, and settings of various sections of the console can be preset separately for each of a plurality of scenes so that the thus-preset settings can be reproduced later in response to a single motion of the human operator. Further, fading amounts in the individual sections of the mixing console can be automatically set in synchronism with time codes output from a commercial-use video tape recorder, MIDI sequencer or the like.

Further, in FIG. 3, reference numeral 6 represents a channel strip section, where there are provided the above-mentioned electric faders 204 for performing control for the individual input and output channels, channel selection keys for selecting a desired channel and operators for setting other parameters. Although 96 input channels are provided in the instant embodiment, the channel strip section 6 includes only 24 electric faders 204 to avoid an increase in the overall size of the mixing console. Therefore, the 96 input channels in the embodiment are divided into four layers each consisting of 24 input channels, and the channel strip section performs the control on a single layer designated from among the four layers (or two layers in the case of two channels set as a stereo channel pair).

Further, in FIG. 3, reference numeral 7 represents a master section, where there are provided output faders for adjusting output levels of the stereo output channel section 128, operators for allocating the layers of the channel strip section 6, etc. Reference numeral 8 represents a machine control section that includes operators to be used for performing various other control. Data input section 9 includes operators to be used for inputting various data. Smart media section 10 has a memory card socket for exchanging data with a desired external memory card.

Furthermore, in FIG. 3, reference numeral 11 represents an analog section that includes operators to be used for making various settings, such as those of gain adjustment and ON/OFF state of a phantom power source, for the analog input sections 102 and 104. Level display section 12 includes level meters for visually displaying levels of audio signals present in various sections of the mixing console, etc. Time code display section 13 displays time codes of a video tape recorder, etc. The following paragraphs describe construction of a principal part of the operation panel.

Figure 4:
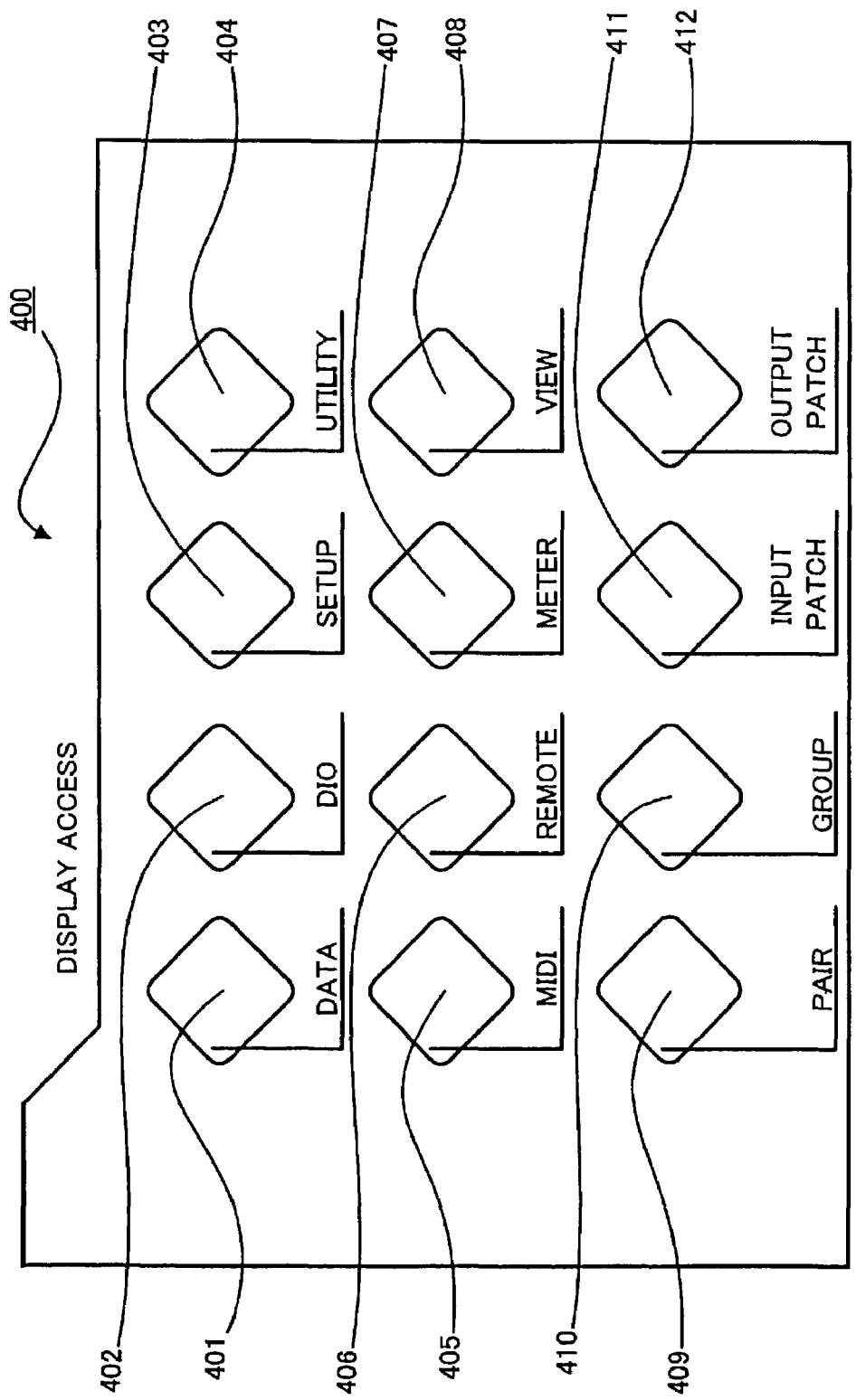
FIG. 4 is a plan view showing an example of a display access section provided in a display control section of FIG. 3.

1.3.2. Display Access Section 400:

The above-mentioned display control section 2 of the operation panel includes a display access section 400 as illustrated in FIG. 4. In this figure, reference numeral 401 represents a DATA key which, upon depression, causes the display device 202 to display a data input/output screen, via which the human operator can make settings, such as data saving, loading, etc. to a memory card set in the smart media section 10. 402 represents a DIO key which, upon depression, causes the display device 202 to display another data input/output screen, via which the human operator can, for example, select which one of the mixing console of the invention and external video tape recorder should have a master function to produce time codes.

Further, in FIG. 4, reference numeral 403 represents a SETUP key which, upon depression, causes the display device 202 to display a setup screen, via which the human operator can customize the processes to be performed by the mixing console. Namely, the various keys provided on the display access section 400 are provided for the human operator to clearly specify contents to be displayed on the display device 202. In the instant embodiment, the keys, such as these keys 401, 402 and 403, having the primary functions of allowing various screens to be displayed on the display device 202 will be referred to as "display keys" or "screen switching keys". In the embodiment of the mixing console, such display keys, each having a square shape, are positioned with a 45-degree inclination relative to the other keys so that the display keys can be readily visually distinguished from the other square-shape keys positioned with no inclination. Because each of the display keys is not imparted with a function of changing mixing conditions of the mixing console, the human operator can operate any one of the display keys, without having to caring about influences on the mixing conditions. The display control section 2 is a section where the display keys having no corresponding dedicated operator on the operation panel are included.

Figure 5:
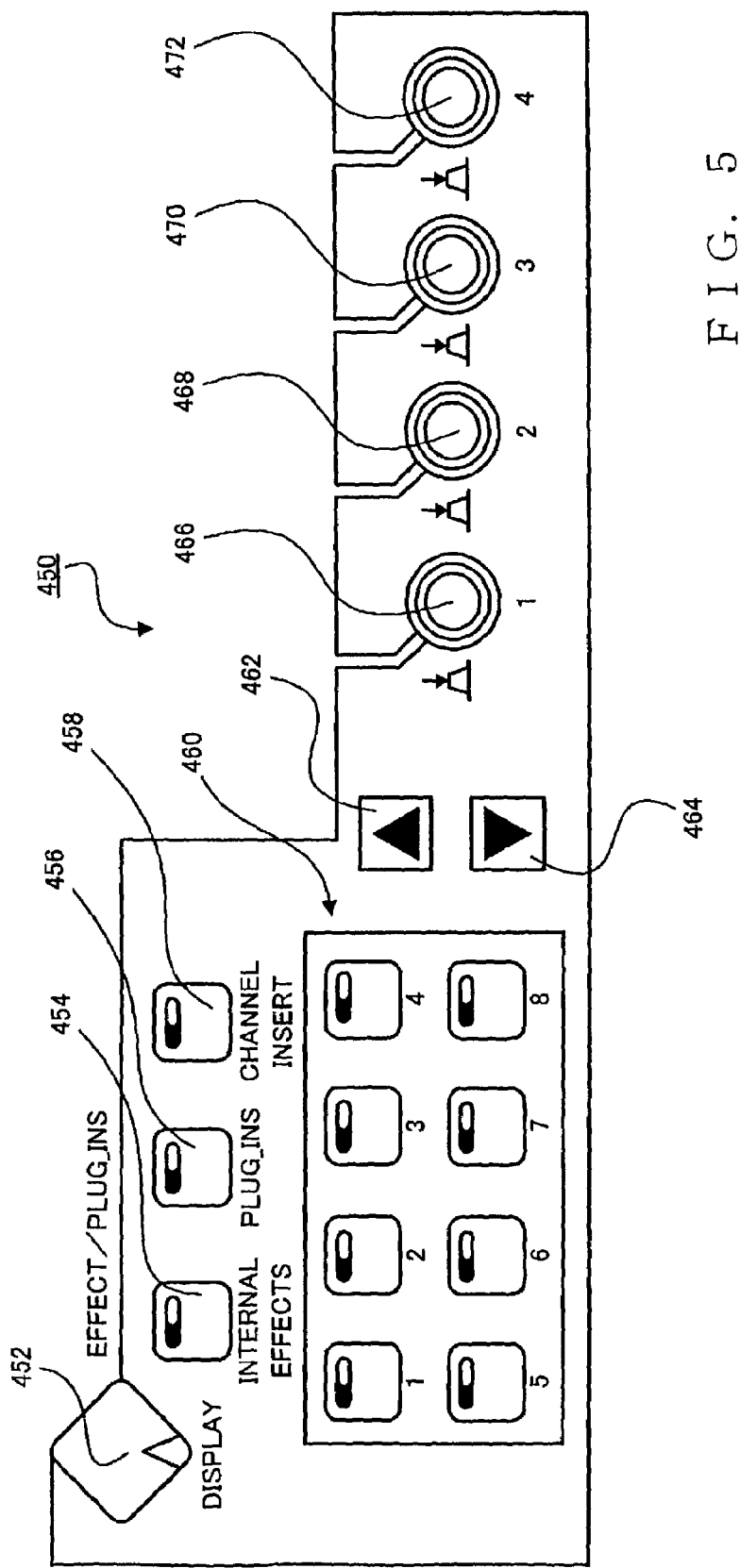
FIG. 5 is a plan view showing an example of an effect plug-in access section provided in the display control section of FIG. 3.

1.3.3. Effect Plug-in Section 450:

The display control section 2 also includes an effect plug-in section 450 as illustrated in FIG. 5. This effect plug-in section 450 is composed of operators to be used for adjusting the eight blocks of effecter and any other effecter added by plug-in. Describing detailed construction of the effect plug-in section 450 with reference to FIG. 5, the section 450 includes a display key 452 to be used for giving an instruction that a screen related to the effect plug-in section 450 should be selected as a displayed screen of the display section 202.

Further, in FIG. 5, reference numeral 454 represents an INTERNAL_EFFECTS key, 456 a PLUG-INS key, 458 a CHANNEL_INSERT key; each of these keys is operable to designate types of an effect and the like for which parameters are to be set. Reference numeral 460 represents a group of number designating keys, which is composed of eight keys corresponding to numbers "1" to "8" and is operable to designate numbers of the designated types of effect and the like. For example, when the fifth block of effecter is to be designated from among the eight blocks of effecter of the internal effecter (INTERNAL_EFFECTS) 108, it is only necessary that the INTERNAL_EFFECTS key 454 be first depressed, followed by depression of the "5" key of the number designating key group.

Further, in FIG. 5, reference numerals 466, 468, 470 and 472 represent volume operators which are to be used for setting various characteristics (parameters) and the like of the selected effect. However, because more than four types of parameters are to be set for any selected effect, an UP key 462 and DOWN key 464 are additionally provided in the effect plug-in section 450. Once the human operator depresses the display key 452, a screen related to the effect plug-in section 450 is shown on the display device 202 as noted above.

On the screen related to the effect plug-in section 450, sets of parameters, each composed of four types of parameters, are displayed for the selected effect, and the human operator can select, via the UP key 462 or DOWN key 464, any one of the sets of parameters to which a particular parameter to be adjusted belongs to. The volume operators 466, 468, 470 and 472 each comprise a rotary encoder and can be rotated with no limit. Because no calibration is provided on or around each of these volume operators, it is not possible to know current volume settings by just viewing the operators 466 to 472. Thus, the instant embodiment is arranged in such a manner that the display device 202 also displays the current settings of the selected parameter set.

Figure 6:
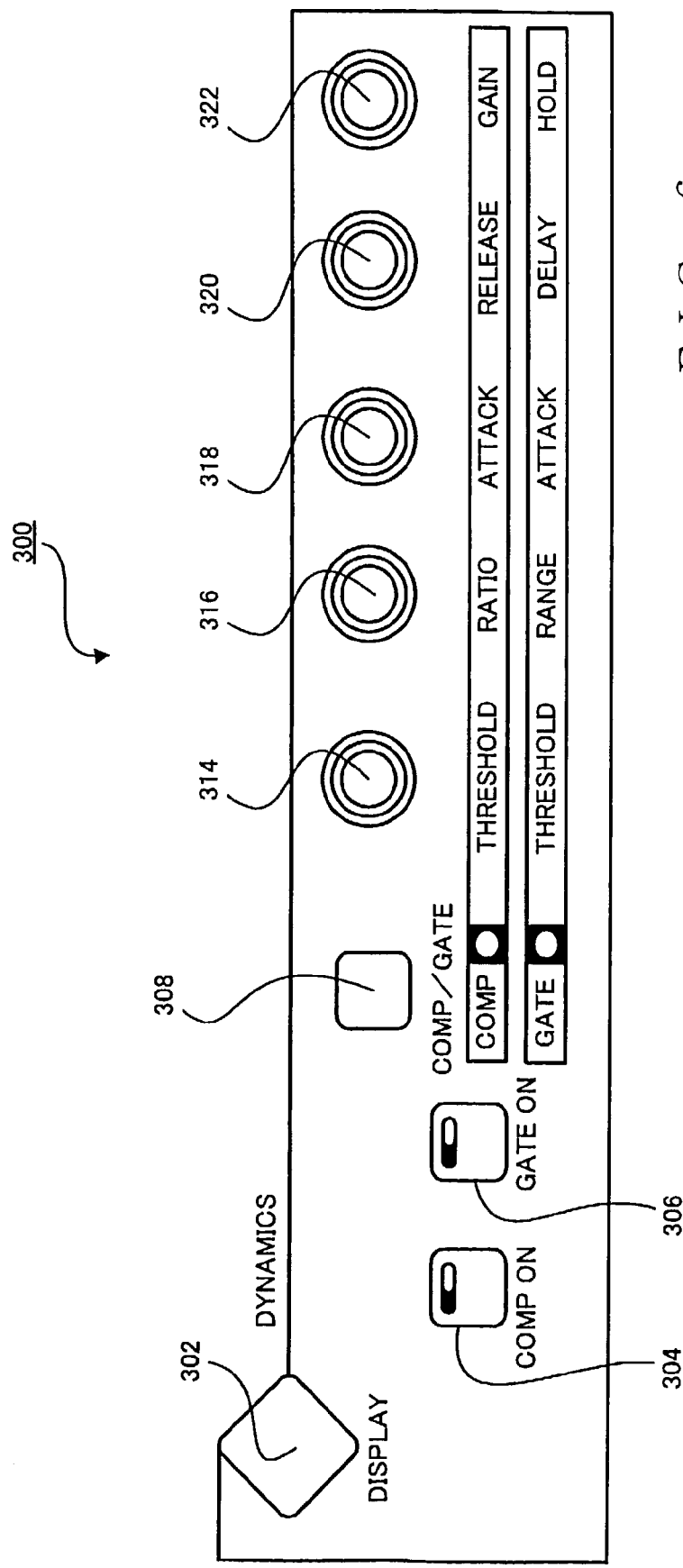
FIG. 6 is a plan view showing an example of a dynamics section provided in a selected channel section of FIG. 3.

1.3.4. Dynamics Section 300:

Further, the selected channel section 3 includes a dynamics section 300 as illustratively shown in FIG. 6. This dynamics section 300 is composed of operators to be used for adjusting a dynamic range of one particular channel selected, via the SEL key, from among the input and output channels. In FIG. 6, reference numeral 302 represents a display key 302 to be used for giving an instruction that screens related to the dynamics section 300 (see FIGS. 12 and 13) should be selected as screens to be shown on the display section 202.

In the instant embodiment of the mixing console, there are provided a compressor (COMP) and gate (GATE) for each of the input channels to make dynamic range adjustment. 304 represents a COMP_ON key which turns on or off the compressor (COMP) of the selected channel in an alternate (toggle-like) manner each time it is depressed. 306 represents a GATE_ON key which turns on or off the gate (GATE) of the selected channel in an alternate (toggle-like) manner each time it is depressed.

Figure 12:
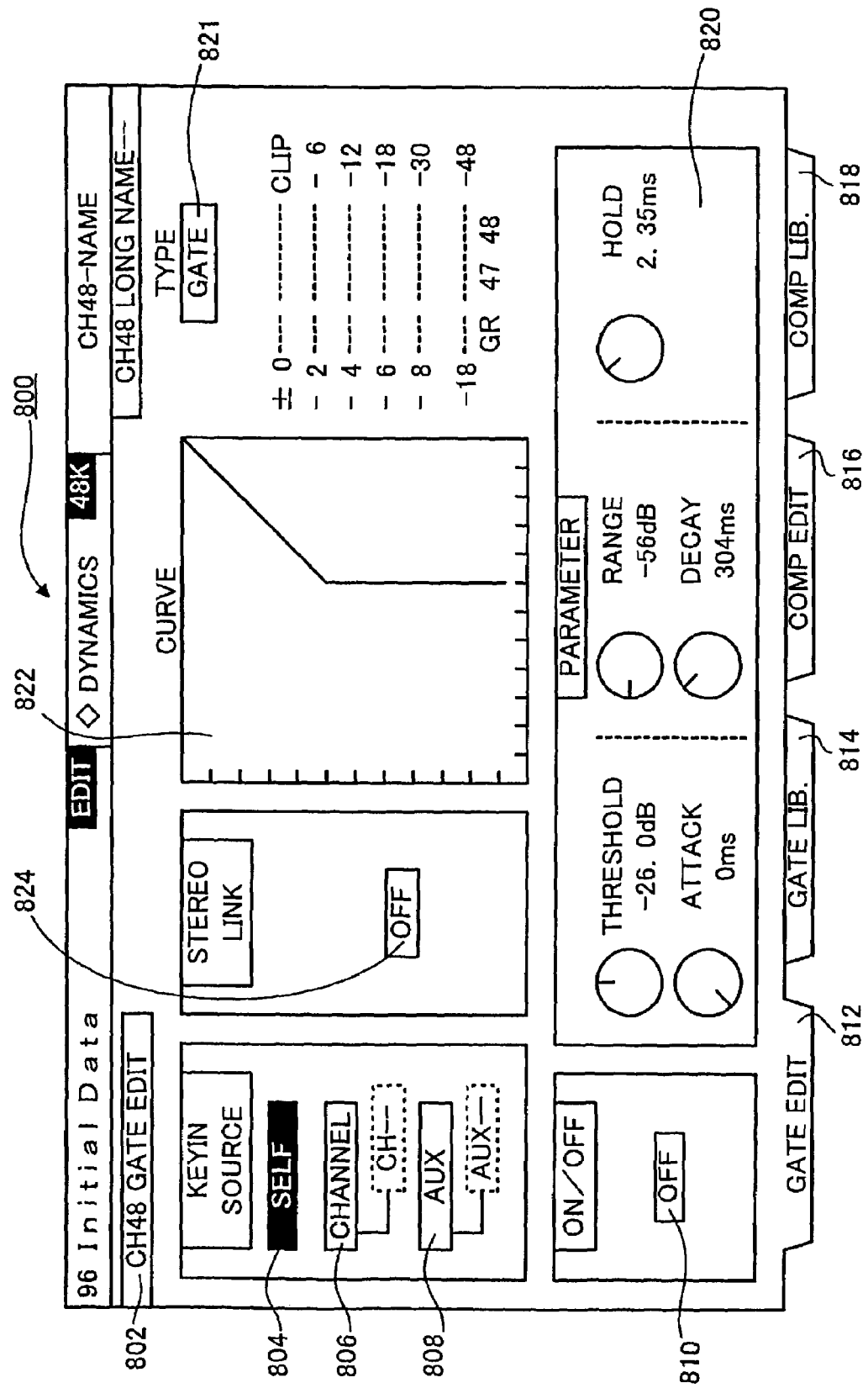
FIG. 12 is a diagram showing an example of a gate adjusting screen displayed on the display device of FIG. 1.
Figure 13:
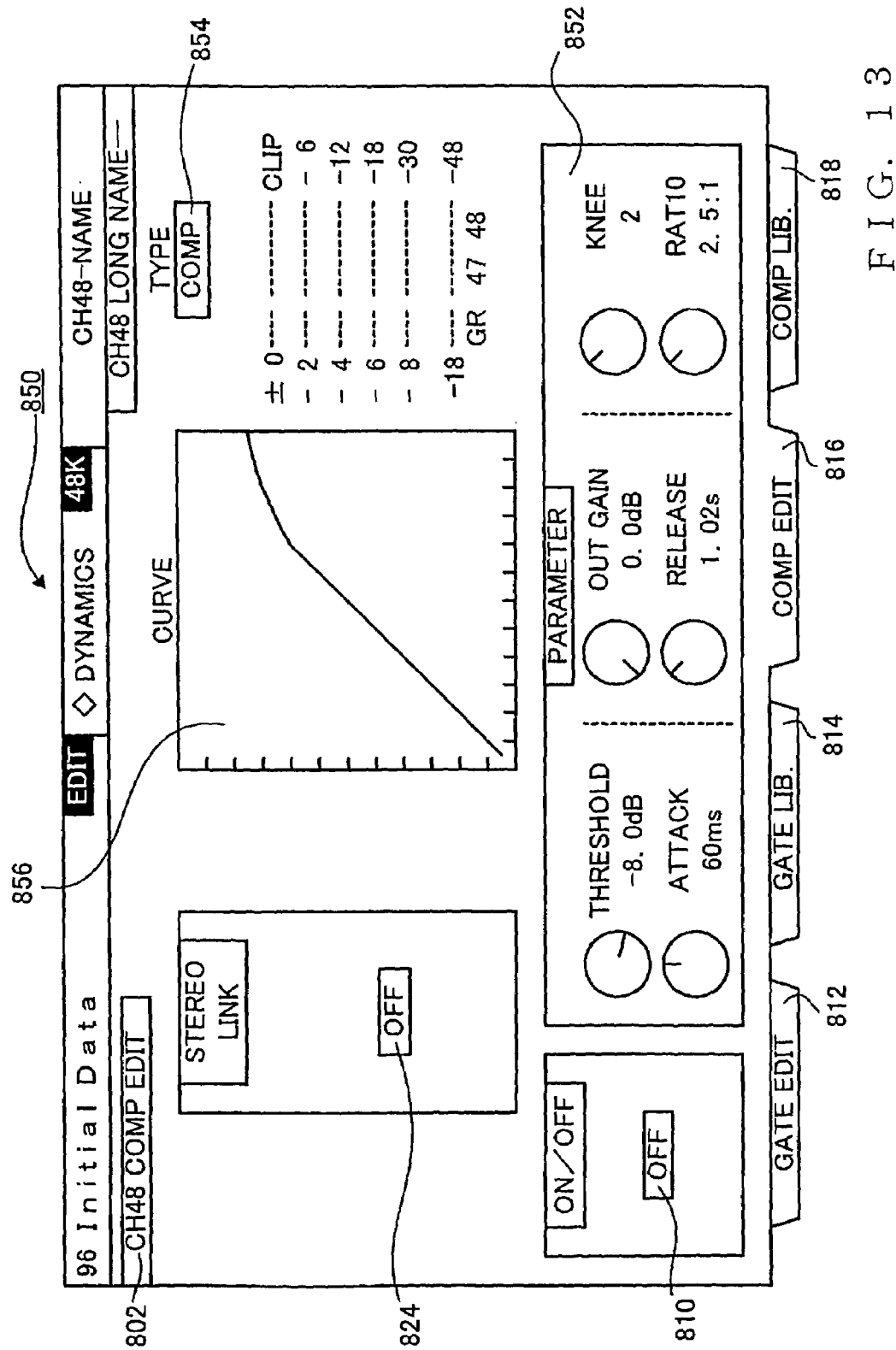
FIG. 13 is a diagram showing an example of a compressor adjusting screen displayed on the display device of FIG. 1.

States of the compressor (COMP) and gate (GATE) are each adjusted by five parameters. Volume operators 314 to 322 are provided for adjusting these five parameters. Like the volume operators 466 to 472 of the effect plug-in section 450, these volume operators 314 to 322 each comprise a rotary encoder, and current settings by the volume operators 314 to 322 can be visually confirmed on the display device 202. COMP/GATE switching key 308 is provided for selecting one of the compressor (COMP) and gate (GATE) which is to be adjusted using the volume operators 314 to 322. 310 and 312 represent a COMP lamp and GATE lamp, respectively, and only one of the lamps 310 or 312, corresponding to the selection by the COMP/GATE switching key 308, is lit or illuminated. Here, the gate (GATE) is provided only in each of the input channels, not in the output channels. Therefore, whenever any one of the output channels is selected by the SEL key, the compressor (COMP), rather than the GATE, is selected. Of FIGS. 12 and 13, FIG. 12 shows a compressor adjusting screen, while FIG. 13 shows a gate adjusting screen.

Figure 7:
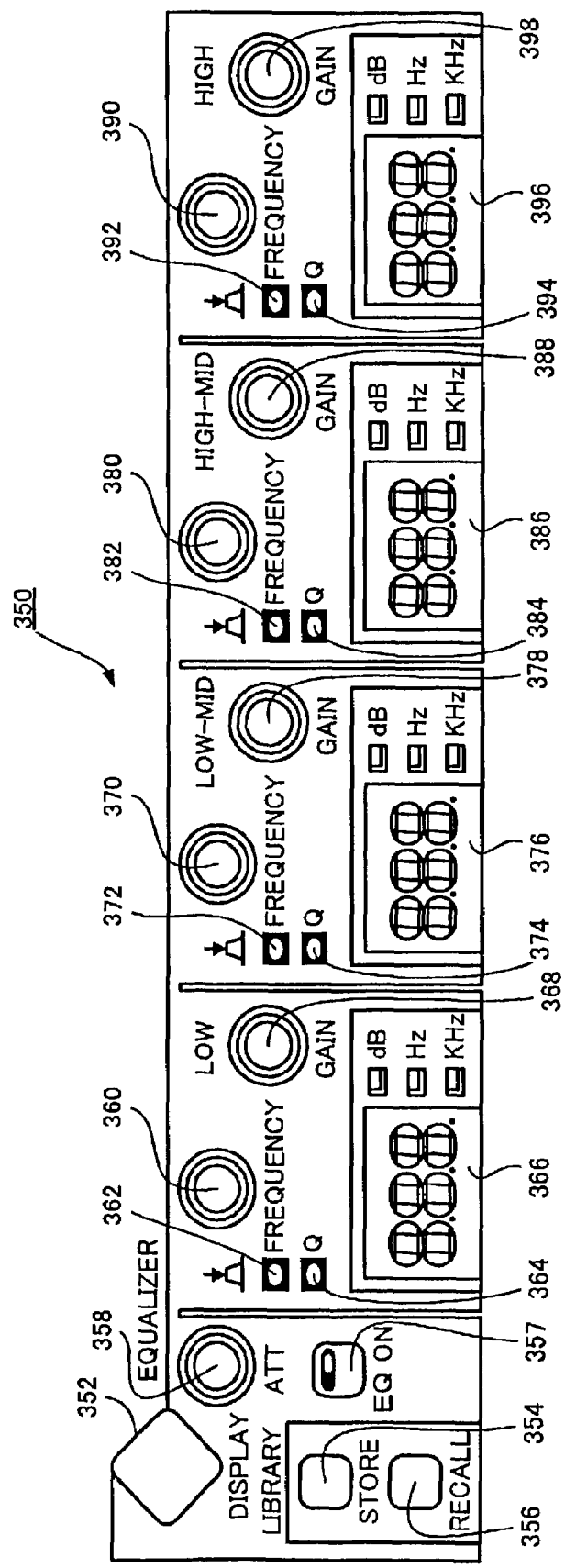
FIG. 7 is a plan view showing an example of an equalizer section provided in the selected channel section of FIG. 3.

1.3.5. Equalizer Section 350:

The selected channel section 3 includes an equalizer section 350 as illustratively shown in FIG. 7. This equalizer section 350 is composed of operators to be used for adjusting frequency characteristics of a designated input channel. In the figure, reference numeral 352 represents a display key to be used for giving an instruction that a screen related to the equalizer section 350 (see FIG. 14) should be selected as a display screen to be shown on the display section 202.

When a store key 354 is depressed, current settings are stored in the flash memory 216. 356 represents a recall key, which, upon depression, causes various components of the equalizer section 350 to be set to respective predetermined states on the basis of the information thus stored in the flash memory 216. Equalizer ON/OFF key 357 switches between ON/OFF states in an alternate or toggle-like manner each time it is depressed.

Further, in FIG. 7, reference numeral 360 represents a low-pitch-range frequency Q volume operator that comprises a rotary encoder. The volume operator 360 is movable between a pushed-in position where the human operator can adjust a Q value via the operator 360 and a pulled-out position where the human operator can adjust a frequency (characteristic-changing center frequency) via the operator 360. 362 and 364 represent a frequency lamp and Q value lamp, respectively, and either one of the lamps 362 or 364 is illuminated at a time to indicate for which the volume operator 360 is being currently used, frequency adjustment or Q value adjustment.

Further, a low-pitch-range gain volume operator 368 is provided for adjusting gain in a low pitch range. Low-pitch-range display 366 is provided for displaying results of the adjustment by the low-pitch-range frequency Q volume operator 360 and low-pitch-range gain volume operator 368. Namely, although the low-pitch-range display 366 normally displays a low-pitch-range frequency, it displays an adjusted Q value or gain for two seconds once the Q value or gain has been adjusted. In the instant embodiment of the mixing console, there are also provided medium-low-pitch-range elements 370 to 378, medium-high-pitch-range elements 380 to 388 and high-pitch-range elements 390 to 398, which are generally similar in construction to the above-described low-pitch-range elements 360 to 368.

Figure 8:
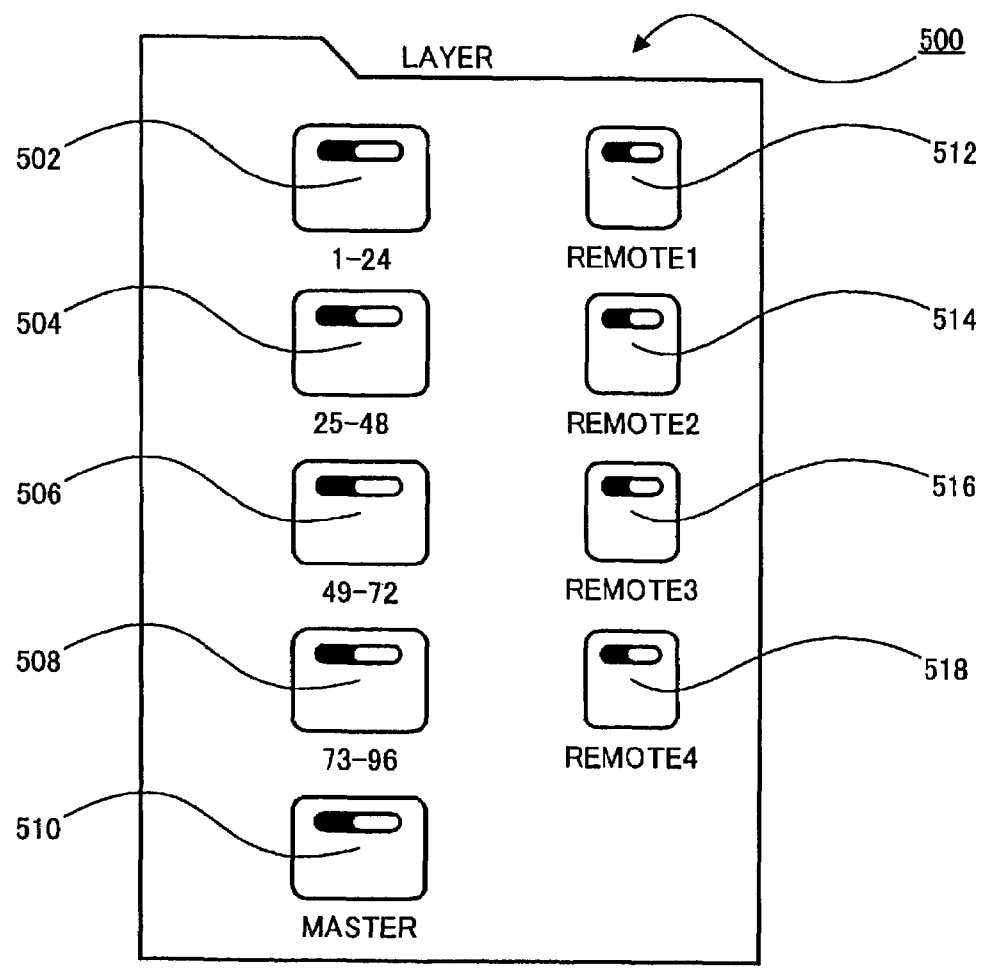
FIG. 8 is a plan view showing an example of a layer section provided in a master section of FIG. 3.
Figure 8:
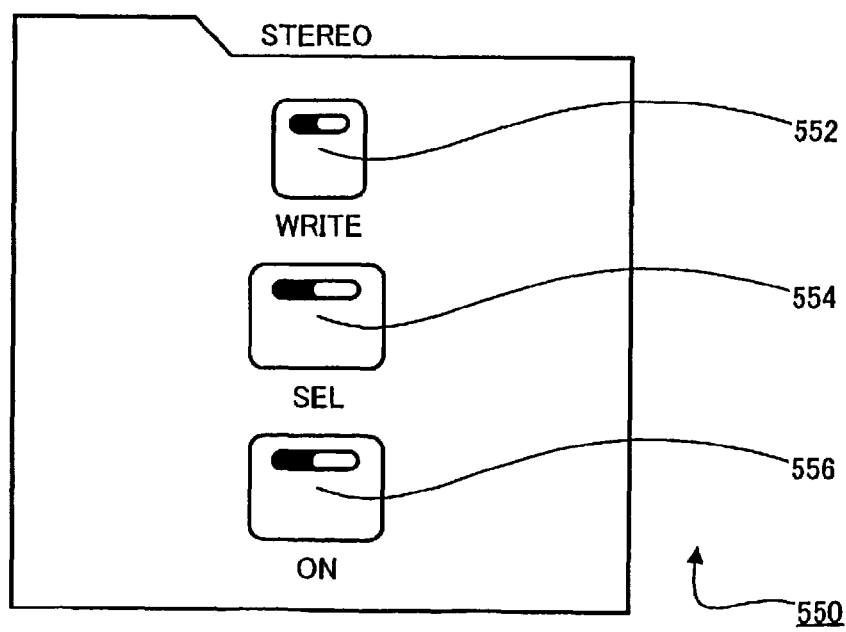

1.3.6. Layer Section 500:

The master section 7 includes a layer section 500 as illustrated in FIG. 8. The layer section 500 includes a first layer designating key 502, second layer designating key 504, third layer designating key 506 and fourth layer designating key 508 for designating a first layer (i.e., the 1st to 24th input channels), second layer (i.e., the 25th to 48th input channels), third layer (i.e., the 49th to 72nd input channels) and fourth layer (i.e., the 73rd to 96th input channels), respectively, as an object of adjustment in the channel strip section 6.

Further, in FIG. 8, reference numeral 510 represents a master layer designating key to be used for designating a master layer as an object of adjustment in the channel strip section 6. Here, the terms "master layer" generically refer to the MIX output channels (8 channels), AUX output channels (12 channels) and matrix output channels (4 channels). Any one of these layer designating keys 502 to 510 is set to an ON state at one time, and any one of the layer designating keys having been thus set to the ON state is lit or illuminated.

Further, reference numerals 512 to 518 represent remote-operation designating keys, which, in response to designation of any one of the first to fourth layers, allow the human operator to remotely operate, via the channel strip section 6, any one of external devices previously assigned respectively to the first to fourth layers. Thus, if an external mixing console, having functions similar to those of the channel strip section 6, is connected to the instant embodiment of the mixing console, it is possible to simultaneously perform fading operation on two or more of the layers. Once such remote operation has been designated for any one of the first to fourth layers via operation of a corresponding one of the remote-operation designating keys 512 to 518, the operated designating key is lit or illuminated.

Note that the layer section 500 has no display key corresponding, for example, to the display key 302 of the dynamics section 300; this is because contents of operation and display related to the layer section 500 are all accomplished via the keys provided in the layer section 500 and thus there is no need to update the state of the display device 202 concerning the contents of operation and display related to the layer section 500.

Figure 11:
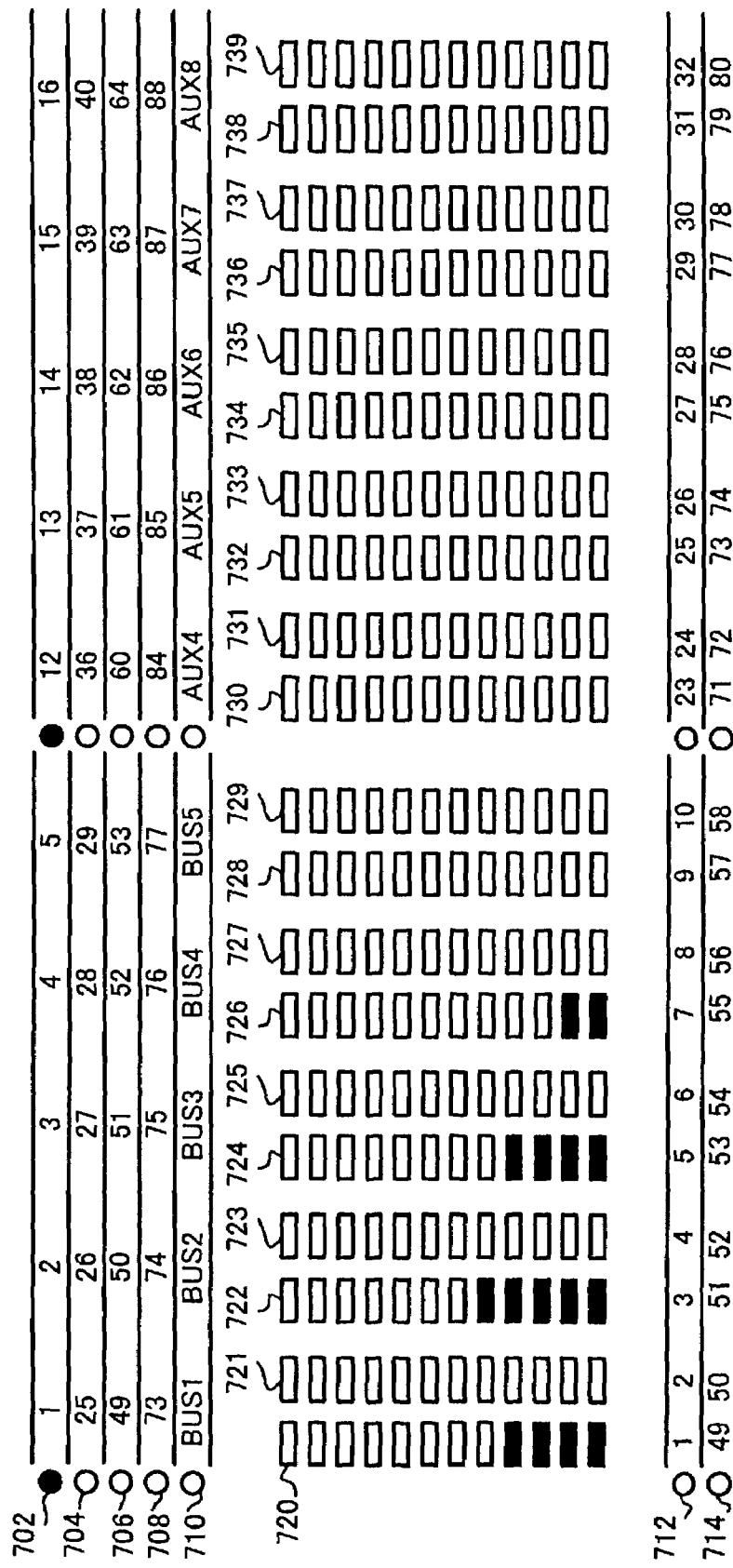
FIG. 11 is a plan view showing an example of a principle part of a level display section of FIG. 3.

1.3.7. Level Display Section 12:

FIG. 11 shows construction of a part of the level display section 12, which includes 20 level indicators 720 to 739. Although not shown in the figure, the level display section 12 includes 28 other level indicators arranged similarly to the 20 level indicators 720 to 739; that is, the level display section 12 includes a total of 48 level indicators. These level indicators are paired, i.e. provided in pairs, and the two level indicators of each pair are positioned close to each other. Reference numerals 702 to 710 represent layer lamps, each of which is lit or illuminated to indicate for which one of the layers the level indicators 720 to 739 are displaying levels.

Specifically, 702 to 708 represent first to fourth layer lamps and 710 a master layer lamp, each of which is illuminated when the level indicators 720 to 739 are displaying levels of the individual channels of the corresponding layer. As noted above, each of the layers consists of 24 channels, and a total of 48 level indicators are provided for each of the layers. For the layers corresponding to the above-mentioned layer lamps 702 to 710, only the left level indicator of each paired level indicators 720 to 739 is used for the level display, with the right level indicator of each of the pairs being not used for the level display.

In the illustrated example of FIG. 11, the first layer lamp 702 is being illuminated, and the level indicators 720 to 739 are displaying levels of the individual channels of the first layer. Namely, in this case, the level indicator 720 displays a level of the first input channel of the first layer, the level indicator 722 displays a level of the second input channel of the first layer, and so on. The layer lamp 712 indicates that the level indicators are displaying levels of the first and second layers. In this case, the level indicators closer to the left end of the horizontal indicator array display levels of smaller channel numbers, while the level indicators closer to the right end of the horizontal indicator array display levels of greater channel numbers. Further, the layer lamp 714 indicates that the level indicators are displaying levels of the third and fourth layers.

Even when any one of the layer lamps 702 to 710 has been selected to be illuminated, levels of two different layers are displayed, via one of the level indicator pairs, for particular two channels of different layers set as a "vertical channel-pairing mode" pair (to be later described in detail). In such a case, the channel of an odd-numbered layer is an "L" (left) channel and thus allocated to the left level indicator of the pair, while the channel of an even-numbered layer is an "R" (right) channel and thus allocated to the right level indicator of the pair. According to such a scheme of display, it is possible to readily ascertain which of the channels are set as a "vertical channel-pairing mode" pair, by just taking a look at the level display section 12.

2. Behavior of the Embodiment

Now, a description will be made about behavior of the embodiment of the audio mixing console, with reference to FIGS. 15A to 15C.

2.1. Screen Switching Operation:

Of the various keys provided on the operation panel, the individual keys and display keys 302, 352 and 452 of the display access section 400 are called "screen switching keys". Once any one of the screen switching keys is depressed, a screen-switching-key event routine shown in FIG. 15A is started up. At step SP2 of the screen-switching-key event routine, a determination is made as to whether the screen corresponding to the depressed screen switching key is currently displayed on the display device 202. With an affirmative (YES) determination at step SP2, the screen-switching-key event routine is brought to an end without performing any other operation. With a negative (NO) determination, on the other hand, the routine proceeds to step SP4 so as to switch the displayed screen of the display device 202 over to the screen corresponding to the depressed screen switching key.

Note that some of the operators (such as the keys and volume operators) provided on the operation panel are associated with various screens to be displayed on the display device 202. Namely, the operators of the dynamics section 300, equalizer section 350 and effect plug-in section 450, having their respective display keys 302, 352 and 452, are associated with the screens to be displayed on the display device 202 when their respective display keys 302, 352 and 452 are depressed. Let it be assumed that the operators associated with a same screen together constitute a same "display group". On the other hand, the keys of each of the other sections having no display key, such as the layer section 500, are not associated with any screen to be displayed on the display device 202 and hence do not constitute a display group.

When any one of the operators associated with one of the screens has been operated, the instant embodiment can set whether or not the corresponding screen should automatically be displayed on the display device 202; such a setting can be made for each of the display groups. Namely, an interlock flag (interlocking information) is stored in the RAM 218 for each of the display groups. Specifically, where the displayed screen of the display device 202 should be switched over to another predetermined screen in response to operation of a particular one of the operators, the interlock flag is set at a predetermined value such as "1", but where the displayed screen of the display device 202 should not be switched over to another predetermined screen in response to operation of a particular operator one of the operators, the interlock flag is set at another predetermined value such as "0".

FIG. 15B shows an operator-operation event routine that is carried out in response to detection of any one of the operators. At step SP12 of the operator-operation event routine, it is determined whether or not the interlock flag is set at the value "1" for the display group which the operated operator belongs to. With a NO determination, the routine proceeds to step SP18, where operations including a parameter change operation, corresponding to the operated operator, are performed. If the operated operator does not belong to any display group, a NO determination is always made at step SP12, and then the operations of step SP18 are carried out.

If, on the other hand the interlock flag is set at the value "1" for the display group as determined at step SP12, a YES determination is made at step SP12, the routine goes to step SP14, where a further determination is made as to whether the screen corresponding to the display group in question has already been displayed, i.e. is being currently displayed on the display device 202. If answered in the affirmative at step SP14, it means that there is no need to switch the screen of the display device 202 to another and thus the routine goes to step SP18. If, on the other hand, the screen corresponding to the display group in question is not currently displayed, the routine goes to step SP16, where the screen corresponding to the display group, to which the operated operator belongs, is displayed on the display device 202. After step SP16, the routine goes to step SP18. At step SP18, operations corresponding to the operated operator are carried out.

Here, the interlock flags can be set for only some (not all) of the various sections shown in FIG. 3. For example, while the interlock flags can be set for the individual sections of the selected channel section, no such interlock flag can be set for the display control section 2 and user-defined key/scene memory/auto. mix section. Namely, the interlock flag can not be set for each section where there is only small necessity to cause the display screen to be interlocked to operator operation; for such a section, the display screen is not interlocked to operation of any of the operators (namely, for such a section, the interlock flag may be considered to be set at the "0" value). The following paragraphs describe specific examples of operations corresponding to the types of operators.

Figure 9:
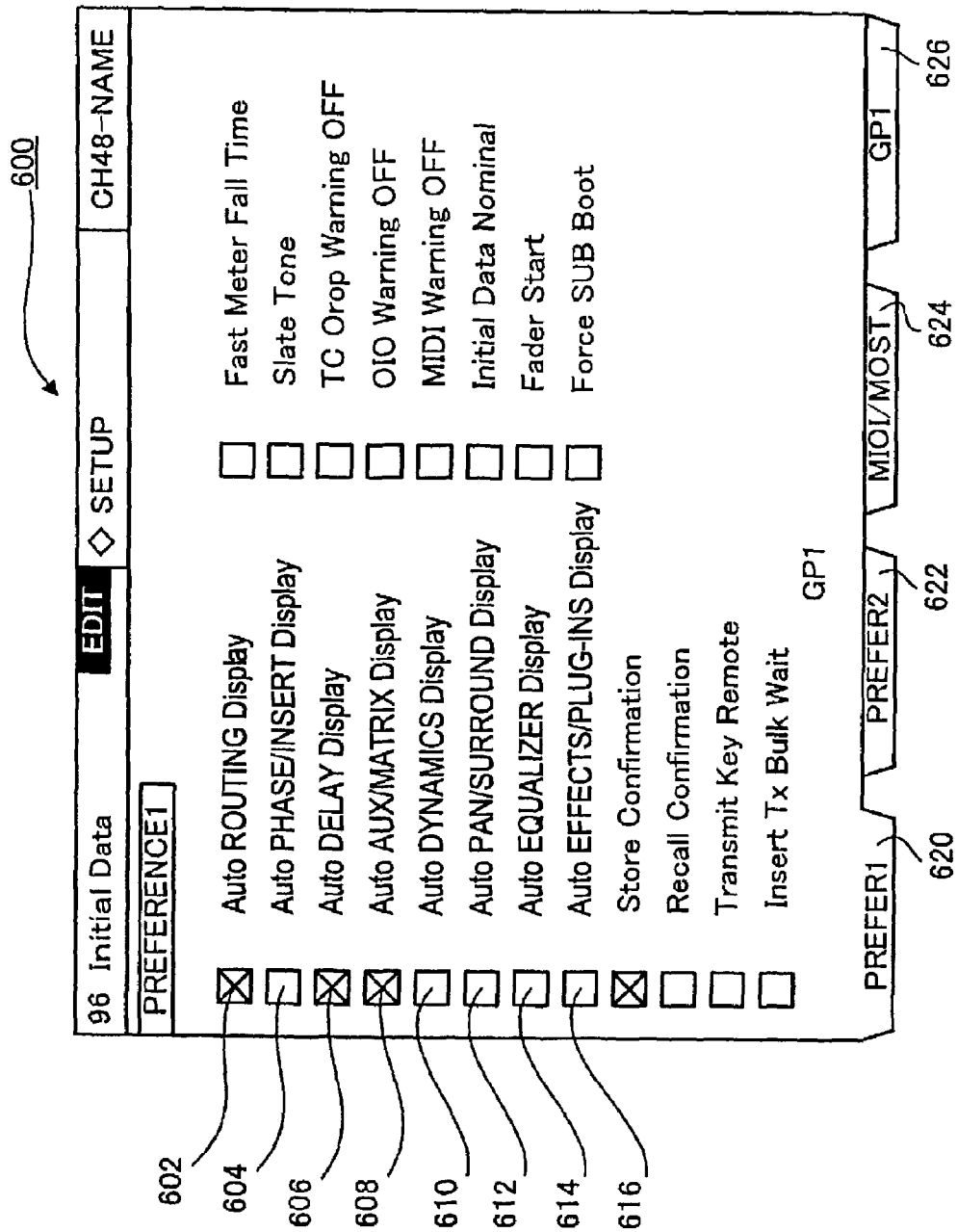
FIG. 9 is a diagram showing an example of a preference screen displayed on a display device of FIG. 1.

2.2. Operation of Preference Screen 600:

Once the SETUP key 403 of the display access section 400 shown in FIG. 4 is depressed, a preference screen 600 as illustrated in FIG. 9 is displayed on the display device 202. On this preference screen 600, there is displayed check boxes for checking ON/OFF settings of various items in the mixing console, so that the human operator can use a joystick to select and click a desired one of the check boxes and thereby reverse the ON/OFF setting of the desired item.

Regarding the thus-displayed check boxes, the above-mentioned interlock flag is set for each of the check boxes 602 to 616 whose names start with "AUTO" and end with "Display". They are provided for each of display groups, such as equalizer (EQ), panning (PAN) and surround (SURROUND). For each of these checkboxes having a check mark placed therein, the corresponding interlock flag is set at the value "1", while for each of the checkboxes having no check mark placed therein, the corresponding interlock flag is set at the value "0".

2.3. Operation of Gate Adjusting Screen 800:

When any one of the following two conditions (1) and (2) has been satisfied while the 48th input channel is being selected by the SEL key, a gate adjusting screen of FIG. 12 is displayed on the display device 202 at step SP4 of FIG. 15A or at step SP16 of FIG. 15B:

(1) when the display key 302 has been depressed while the gate (GATE) is being selected by the COMP/GATE switching key 308; and (2) when 1) the gate (GATE) has been selected by the COMP/GATE switching key 308, 2) the Auto EQ Display interlock flag (corresponding to the check box 602 of FIG. 9) has been set at "1" and 3) any one of the operators of the dynamics section 300 has been operated.

Note that, in the instant embodiment of the mixing console, only the input channels of the input channel section 114 are provided with the respective gates (GATEs). Therefore, when any one of the MIX output, AUX output, stereo output and matrix output channels is selected, it is not possible to select the gate (GATE) via the COMP/GATE switching key, and therefore no gate adjusting screen is displayed on the display device 202.

In FIG. 12, reference numeral 802 represents a channel number display section which displays the number of the input channel (in the illustrated example, the 48th input channel) to be subjected to gate (GATE) adjustment. 804, 806 and 808 represent a SELF button, CHANNEL button and AUX button, respectively, and once any one of these buttons 804, 806 or 808 is selected, a trigger to start up a dynamic process is designated. ON/OFF button 810 is operable to instruct an ON/OFF state of the gate (GATE) function. Namely, the ON/OFF state of the gate (GATE) function can be switched via either the ON/OFF button 810 or the above-mentioned GATE_ON key 306.

Further, in FIG. 12, reference numerals 812 to 818 represent page switching tags. When the cursor associated with the joystick is moved to point to any one of the page switching tags and clicks the one tag, the current displayed contents of the display device 202 is switched over to a screen corresponding to the clicked tag. Particularly, if the page switching tag 816 is clicked by the joystick, a screen as illustrated in FIG. 13 is displayed as will be later described. In other words, any desired one of four image pages can be selected via the page switching tags 812 to 818, and also two of the image pages (see FIGS. 12 and 13), which are used more frequently than the others, can be selected via the COMP/GATE switching key 308 shown in FIG. 6.

Reference numeral 820 represents a parameter display/setting section, which displays parameter values adjusted by the volume operators 314 to 322 and images simulating the volume operators 314 to 322. When the human operator operates any one of the volume operators 314 to 322, an increase/decrease in the value of the parameter based on the human operator's operation can be immediately reflected in the parameter display/setting section 820. Further, by moving the cursor to point to any one of the images of the volume operators 314 to 322, the human operator can also input any desired value of the parameter in question via the data input section 9. Namely, the values of the individual parameters can also be adjusted on the screen via the volume operators 314 to 322.

Reference numeral 821 represents a type display section, by which a desired type of the gate (GATE) can be selected and displayed. Note that, as the type of the gate (GATE), either "GATE" (in the narrow sense of the word) or "DUCKING" can be selected. 822 represents a characteristic curve display section, where are displayed characteristic curves obtained by the above-mentioned parameters. Stereo link switch 824 is provided for setting whether or not the parameters of the channel should be linked with parameters of the other channel constituting a stereo pair with that channel.

2.4. Operation of Compressor Adjusting Screen 850:

When any one of the following two conditions (1) and (2) has been satisfied while the 48th input channel is being selected by the SEL key, a compressor adjusting screen of FIG. 13 is displayed on the display device 202 at step SP4 of FIG. 15A or at step SP16 of FIG. 15B:

(1) when the display key 302 has been depressed while the compressor (COMP) is being selected by the COMP/GATE switching key 308; and (2) when 1) the compressor (COMP) has been selected by the COMP/GATE switching key 308, 2) the Auto EQ Display interlock flag (corresponding to the check box 602 of FIG. 9) has been set at "1" and 3) any one of the operators of the dynamics section 300 has been operated.

Note that, in the instant embodiment of the mixing console, the compressors are provided for the MIX output, AUX output, stereo output and matrix output channels as well as the input channels. Thus, when any one of these channels is selected by the SEL key, it is also possible to display the compressor adjusting screen for the selected channel.

The compressor adjusting screen 850 includes a channel number display section 802, ON/OFF button 810, page switching tags 812 to 818 and stereo link switch 824, similar to those of the gate adjusting screen 800. Reference numeral 852 represents a parameter display/setting section, which, similarly to the parameter display/setting section 820 of the gate adjusting screen 800, displays parameter values adjusted by the volume operators 314 to 322 and images simulating the volume operators. Note that whereas five volume operators 314 to 322 are provided on the operation panel, the images of six volume operators are displayed on the parameter display/setting section 852.

Stated otherwise, a parameter "KNEE", displayed at an upper right position of the parameter display/setting section 852, can be adjusted only on this display/setting section 852; that is, it can not be adjusted by the volume operators 314 to 322. Function to adjust the parameter "KNEE" is not imparted to the volume operators on the operation panel because the parameter "KNEE" is used less frequently than the other parameters.

854 represents a type display section, by which a desired type of the compressor (COMP) can be selected and displayed. Note that the type of the compressor (COMP) can be selected from among "COMP" (in the narrow sense of the word), "EXPAND" and "COMPANDER". 856 represents a characteristic curve display section, where are displayed characteristic curves obtained by the above-mentioned parameters similar to the characteristic curve display section 822 of the gate adjusting screen 800.

Figure 14:
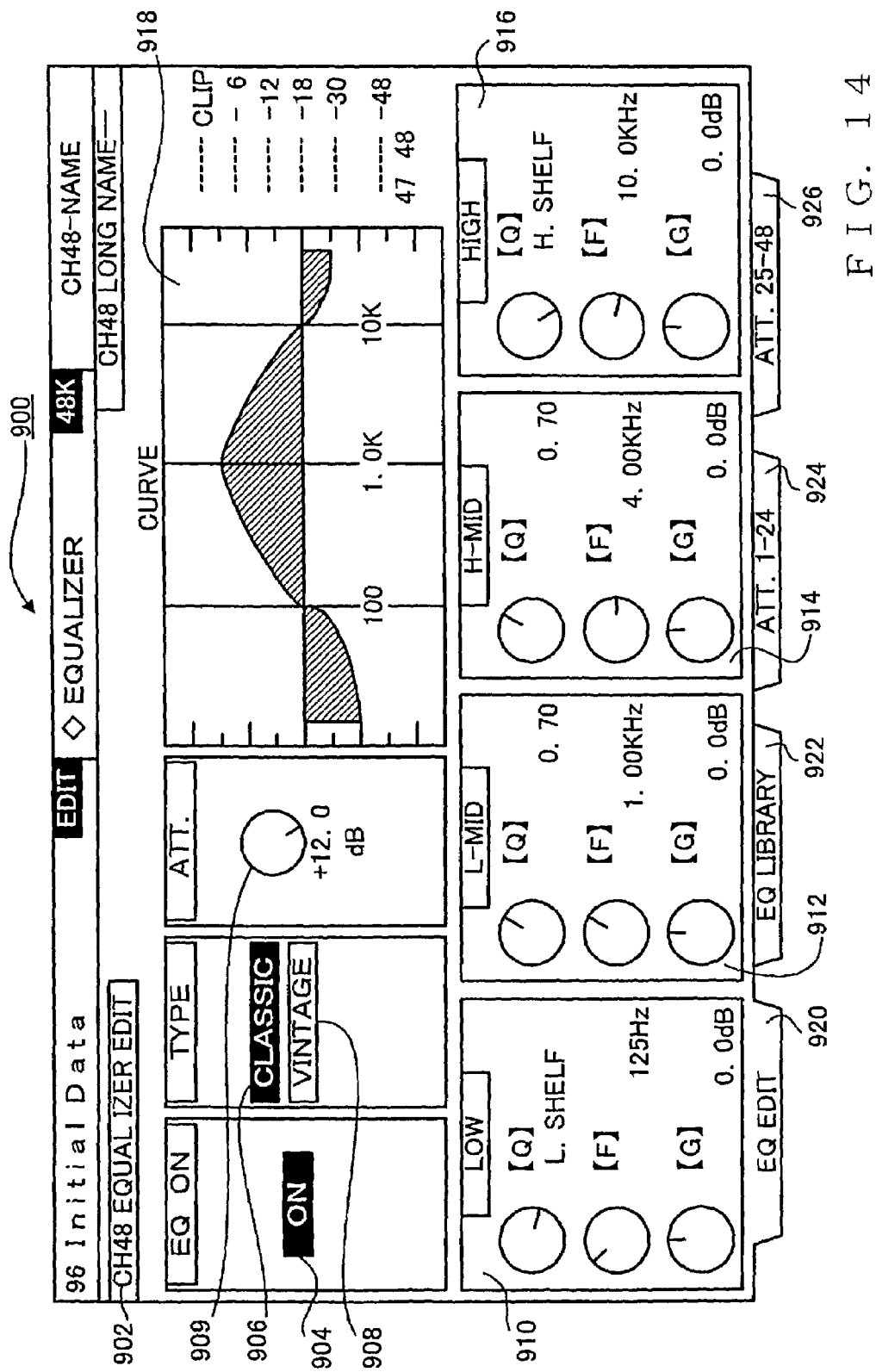
FIG. 14 is a diagram showing an example of an equalizer adjusting screen displayed on the display device of FIG. 1.

2.5. Operation of Equalizer Adjusting Screen 900:

When any one of the following two conditions (1) and (2) has been satisfied while the 48th input channel is being selected by the SEL key, an equalizer adjusting screen of FIG. 14 is displayed on the display device 202 at step SP4 of FIG. 15A or at step SP16 of FIG. 15B:

(1) when the display key 352 of the equalizer section 350 has been depressed; and (2) when the Auto EQ Display interlock flag (corresponding to the check box 602 of FIG. 9) has been set at "1" and any one of the equalizer section 350 has been operated.

Note that, in the instant embodiment of the mixing console, the equalizer is provided not only in each of the input channels but also in each of the output channels and thus it is also possible to display the equalizer adjusting screen for each of these input and output channels.

The equalizer adjusting screen 900 includes a channel number display section 902 to display the number of a particular channel (selected by the SEL key from among the input and output channels) to be subjected to an equalizer process. 904 represents an equalizer ON/OFF button that switches an ON/OFF state of the equalizer in an alternate or toggle-like manner each time it is depressed. Namely, the equalizer ON/OFF button is equivalent to the equalizer ON/OFF key 357. 906 and 908 represent a CLASSIC button and VINTAGE button, respectively, either one of which is selectively activated to set a type of the equalizer process. Attenuation amount display/setting section 909 is provided for displaying an attenuation amount set via a volume operator 358.

By moving the cursor to point to an image of a volume operator displayed on the attenuation amount display/setting section 909, it is possible for the human operator to enter a desired attenuation amount via the data input section 9. Low-pitch-range display/setting section 910 is provided for displaying respective settings of a Q value, frequency and gain for a low pitch range, as well as three volume operators. By moving the cursor to point to the displayed volume operators, it is possible for the human operator to directly enter a desired Q value, frequency and gain via the data input section 9, without using the volume operators 360 and 368. 912, 914 and 916 represent a medium-low-pitch-range display/setting section, medium-high-pitch-range display/setting section and high-pitch-range display/setting section, respectively, each of which is provided for displaying/setting a desired Q value, frequency and gain in the corresponding pitch range. 918 represents a characteristic curve display section, which displays frequency characteristic curves on the basis of results of setting by the individual pitch-range display/setting sections 910 to 916.

2.6. Display on Pair Setting Screen 650:

Once a PAIR key 409 is depressed in the display access section 400, a pair setting screen 650 as shown in FIG. 10A or 10B is displayed on the display device 202. Here, the "pair" means two channels between which various parameters should be interrelated or interlocked, in a case where stereo audio signals are to be produced. In the instant embodiment, it is possible to select, as a channel-pairing mode, either a "horizontal channel-pairing mode" or a "vertical channel-pairing mode". The "horizontal channel-pairing mode" is directed to forming a channel pair in accordance with the serial order of the channel numbers.

For example, in the horizontal channel-pairing mode, the first and second input channels are paired and the third and fourth input channels are paired, as illustrated in FIG. 10A. In the vertical channel-pairing mode, on the other hand, the corresponding channels of two different layers are paired. For example, in the vertical channel-pairing mode, the first input channel of the first layer and first input channel of the second layer (i.e. 25th input channel in the whole channel group) are paired and the second input channel of the first layer and second input channel of the second layer (i.e. 26th input channel in the whole channel group) are paired, as illustrated in FIG. 10B. Pairs may of course be formed, in the vertical channel-pairing mode, between the corresponding channels of the third and fourth layers, like the corresponding channels between the first and second layers.

In FIGS. 10A and 10B, reference numerals 652 and 654 represent a horizontal channel-pairing mode switch and vertical channel-pairing mode switch, respectively, one of which is selectively turned on to designate the horizontal or vertical channel-pairing mode switch. Reference numerals 660 and 670 represent left channel display elements, while 661 and 671 represent right channel display elements. The left and right channel display elements display the numbers of the individual paired channels. M/S (MONAURAL/STEREO) mode display areas 662 and 672 display M/S mode settings of the individual paired two channels. Specifically, if a normal heart mark is displayed as illustrated in the M/S mode display area 662, it means that the M/S mode setting is "STEREO", while if a broken heart mark is displayed as illustrated in the M/S mode display area 672, it means that the M/S mode setting is "MONAURAL".

Reference numerals 664 and 674 represent MS mode changing switches, which can switch the M/S mode between "STEREO" and "MONAURAL" in an alternate or toggle-like manner. 682, 684 and 686 represent layer switching tags which are provided in corresponding relation to the layers for which the channel-pairing mode or M/S mode is to be set. Note that the horizontal or vertical channel-pairing mode can be set independently between the first and second layers and between the third and fourth layers. For example, the vertical channel-pairing mode can be set between the first and second layers, and the horizontal channel-pairing mode can be set between the third and fourth layer.

If the M/S mode is set to the STEREO mode, some of the parameters are shared between the paired two channels. Among the parameters to be shared between the paired two channels are a setting of the gate (GATE), setting of an insertion effect, attenuation amount (set by the volume operator 358), setting of the equalizer, setting of the compressor (COMP), ON/OFF of the channel, fading amount, setting as to whether the AUX output channel should be subjected to pre-fade or post-fade, ON/OFF of the AUX output channel, level of the AUX output channel, etc. Further, among the parameters to be not shared between the paired two channels are a patch state of the input patch section 112, presence/absence of phase inversion, panning state, various other patch states, etc. Note that regarding the panning, interlock (called "GANG") in a same direction or opposite directions can be set between the paired two channels.

If the channel-pairing mode is set to the vertical channel-pairing mode, one stereo channel (i.e., two monaural channels) can be assigned to one electric fader. Therefore, in case the M/S modes of all the channel pairs in the first and second layers are set to "STEREO", tone volume etc. of 24 stereo channels can be controlled via the 24 electric faders. If, on the other hand, the channel-pairing mode is set to the horizontal channel-pairing mode, then one stereo channel is assigned to a pair of adjoining electric faders; thus, in this case, tone volume etc. of only 12 stereo channels can be controlled via the 24 electric faders. In case the M/S mode is set to "STEREO" in the horizontal channel-pairing mode, and when one of the paired electric faders is operated, the other electric fader is also adjusted to take the same fader position as the one electric fader.

2.7. Process Responsive to Fader Operation:

This and following paragraphs describe a process (input-channel fader operation event routine) to be performed when any one of the faders has been operated in the channel strip section 6, with reference to FIG. 15C. At step SP22 of FIG. 15C, the current settings of the M/S mode and channel-pairing mode corresponding to the operated fader are determined, and the routine branches depending on the determination result. First, if the M/S mode is currently set to "MONAURAL", the routine branches to step SP24 irrespective of the channel-pairing mode setting of the layer in question.

At step SP24, the level of the input/output channel corresponding to the operated electric fader is controlled. Namely, because the layer section 500 uniquely designates a layer of the channel strip section 6 as explained above in relation to FIG. 8, the input/output channel to be controlled in tone volume can be uniquely determined once the particular electric fader operated has been identified. If, on the other hand, the M/S mode is currently set to "STEREO", a different step is taken depending on the channel-pairing mode.

Namely, when the horizontal channel-pairing mode is currently designated, the routine goes to step SP26, where the levels of the input/output channel corresponding to the operated electric fader and the other or adjoining channel paired with the input/output channel are adjusted. At that time, the fader position of the adjoining channel is moved to agree with (i.e., be interlocked with) that of the operated fader. When, on the other hand, the vertical channel-pairing mode is currently designated, the routine goes to step SP28, where the levels of the input/output channel corresponding to the operated electric fader and the other channel paired with the input/output channel (i.e., corresponding channels of the adjoining layers) are adjusted. Note that not only the fader-based level (fading amount) but also all of the other parameters, having been explained above as shared in the STEREO mode (such as the settings of the gate, insertion effect, equalizer, etc.), are caused to vary in an interlocked or ganged fashion between the paired channels.

3. Benefits Achievable by the Embodiment

The instant embodiment of the audio mixing console, arranged in the above-described manner, achieves the following advantageous results or benefits.

First, in the instant embodiment, it is possible to set, in accordance with the interlock flag, whether or not the displayed contents of the display device 202 should be switched in response to operation of any one of the various operators (see FIG. 9). Thus, only setting the interlock flag at the value "1" can eliminate a need for the human operator to perform particular operation for switching the displayed contents of the display device 202, so that the mixing console of the invention can be manipulated with enhanced efficiency.

In some cases, the human operator may not want a current displayed screen switched to another. Let's suppose a case where frequency characteristics of a given input channel are to be adjusted by manipulation of the equalizer section 350. The purpose of manipulating the equalizer section 350 is to set tone quality of the given channel to optimal conditions. Therefore, if the human operator is equipped with skill to adjust output tones to optimal conditions while actually listening to the output tones, there is no need for displaying the equalizer adjusting screen 900 on the display device 202; thus, in such a case, it is more preferable that other useful information be left displayed on the display device 202, without the displayed useful information being switched over to the equalizer adjusting screen 900.

Namely, whether or not the screen related to an operated operator should be displayed on the display device 202 depends on the type of the operated operator, skill of the human operator, conditions of a concert hall, etc. Further, on the preference screen 600 in the instant embodiment, it is possible to set, for each of the display groups, whether or not the screen of the display device 202 should be interlocked with operation of the operator, so that an optimal display state corresponding to the various conditions can be provided to the human operator.

Further, in the instant embodiment, it is possible to set, for each of the layers, the horizontal or vertical channel-pairing mode, as described above in relation to FIGS. 10A and 10B. When the vertical channel-pairing mode is set, the limited number of the electric faders in the channel strip section 6 can be utilized efficiently.

However, even in the case of paired audio signals whose M/S mode setting is "STEREO", they sometimes lack left and right tone volume balance, or in some case the human operation intentionally throws the left and right tone volume out of balance. To deal with such collapse in the left and right tone volume balance, it is more advantageous to employ the horizontal channel-pairing mode. This is because, when the human operator has sensed a collapse in the stereo balance or attempted to collapse the stereo balance, the horizontal channel-pairing mode allows the respective tone volume of the two channels to be simultaneously adjusted independently of each other after the M/S mode is switched over to "MONAURAL".

After all, how the channel-pairing mode should be set depends on a difference between the necessary numbers of the input channels and faders, whether the left and tone volume balance of a stereo input source is stable or not, etc. In the instant embodiment, a desired channel-pairing mode can be selected on the basis of such a comprehensive standpoint, with the result that a channel-paring mode with highest operability can be selected.

4. Modifications

The present invention should not be construed as limited to the above-described embodiments alone, and various modifications of the invention are also possible as stated below.

(1) Whereas the above-described embodiments are constructed to implement various functions by means of computer programs running on the mixing console, only such programs may be stored in a recording medium, such as a CD-ROM or floppy disk, so that they can be supplied in the recording medium, or may be supplied via a communication path.

(2) Further, whereas the embodiments have been described in relation to the case where the principles of the present invention are applied to an audio mixing console, the present invention may be applied to any of various electronic musical instruments, music programs for execution on desk-top computers, etc. without being restricted to such audio mixing consoles.

(3) Furthermore, although the embodiments have been described as combining (pairing) two channels as a set of channels to be processed, three or more channels (e.g., four channels) may be combined as such a set.

In summary, the present invention is characterized by switching the displayed screen on the display device over to a predetermined screen related to an operated operator on condition that the interlocking information is indicative of a predetermined value, but keeping the current displayed screen on the display device unchanged, irrespective of the operation of the operator, on condition that the interlocking information is indicative of another value than the predetermined value. Thus, the present invention allows the displayed contents of the display device to be automatically changed in accordance with a manner of operation by the human operator.

The present invention is also characterized by allowing a selection between the first and second channel-combining modes, determining a set of channels including k-th and (k+m)th channels when the second channel-combining mode is selected, and interlocking editing parameters between the audio signals of the determined set of channels. Thus, the present invention permits efficient use of the operators such as the faders. The present invention is further characterized by, on the basis of editing parameters of the k-th channel belonging to a selected layer, setting parameters of a p-th channel which belongs to another layer than the selected layer and has a predetermined relationship with the k-th channel. This arrangement also permits efficient use of the operators such as the faders.

The present invention relates to the subject matter of Japanese Patent Application Nos. 2001-289508 and 2001-289509 both filed on Sep. 21, 2001, the disclosure of which is expressly incorporated herein by reference in its entirety.

What is claimed is:

1. An audio signal editing apparatus comprising:
   an operation panel including a display device and a plurality of operators, said display device and said plurality of operators being provided on said operation panel, said operators divided into a plurality of operator groups, said display device being capable of selectively displaying one of a plurality of screens corresponding to the respective operator groups;
   a first memory that stores a plurality of parameters;
   a signal processing section that performs signal processing on an input audio signal to output a processed audio signal, said signal processing section performing the signal processing on the basis of the parameters stored in said first memory;
   a second memory that stores interlocking information which indicates whether an interlocking function is valid or invalid for each of the operator groups, wherein said interlocking function interlocks the operation of any one or more of the operators on said operation panel by a user with a control to display a screen corresponding to a particular one of the operator groups which the operator on said display device belongs to;
   a setting section that sets the interlocking information in said second memory in response to operation by a user;
   a parameter change section that, in response to operation by the user of any one of said operators, changes a value of the parameter, stored in said first memory, that corresponds to the one operator; and
   a screen change section that, in response to operation by the user of any one of said operators, controls said display device to display said screen corresponding to a particular one of the operator groups, which the user-operated operator belongs to, when said interlocking information indicates said interlocking function of the particular operator group is valid, and said screen change section keeps a current screen displayed on said display device unchanged when said interlocking information indicates said interlocking function of the particular operator group is invalid.

2. An audio signal editing apparatus as claimed in claim 1 wherein said setting section includes:
   an interlocking information display control section that causes said display device to display current settings of the interlocking information stored in said second memory; and
   an interlocking information change section that, in response to operation of any one of said operators, changes the setting of a corresponding one of the interlocking information during display, on said display device, of the current settings.

3. An audio signal editing apparatus as claimud in claim 1 wherein said operation panel further includes a plurality of display instructing operators in association with the plurality of operator groups, and
   said screen change section, in response to operation of the display instructing operator associated with one of the operator groups, causes said display device to display a screen corresponding to the one operator group irrespective of whether the interlocking information indicates said interlocking function is valid or invalid, for the one operator group.

4. An audio signal editing apparatus as claimed in claim 3 wherein said display instructing operators have respective key tops different in outer appearance from respective key tops of said operators.

5. A method for controlling an audio signal editing apparatus including a display device, a memory that stores a plurality of parameters, a signal processing section that performs signal processing on an input audio signal, on the basis of the parameters stored in the memory, to thereby output a processed audio signal and a plurality of operators operable to change values of the parameters stored in the memory, said operators divided into a plurality of operator groups, said display device and said plurality of operators being provided on an operation panel, said display device being capable of selectively displaying one of a plurality of screens corresponding to the respective operator groups, said method comprising:

a step of setting interlocking information which indicates whether an interlocking function is valid or invalid for each of the operator groups, wherein said interlocking function interlocks the operation of any one or more of the operatons on said operation panel by a user with a control to display a screen corresponding to particular one of the operator groups which the operator on said display device belongs to; and a step of, in response to operation by the user of any one of said operators provided on said operation panel controlling said display device provided on said operation panel to display said screen corresponding to a particular one of the operator groups, which the user-operated operator belongs to, when said interlocking information indicates said interlocking function is valid, and keeps a current screen displayed on said display device unchanged when said interlocking information indicates said interlocking function is invalid.

6. A method as claimed in claim 5 wherein said interlocking information is stored in a storage section in association with the predetermined one or more of said operators.

7. A method as claimed in claim 6 wbcrcin said step of setting interlocking information includes:

a step of causing said display device to display current settings of the interlocking information stored in said storage section; and a step of, in response to operation of any one of said operators, changing the setting of a corresponding one of the interlocking information during display, on said display device, of the current settings.

8. A method as claimed in claim 5 wherein said audio signal editing apparatus further includes a plurality of display instructing operators, said display instructing operators additionally provided in association with the plurality of the operator groups, and said method further comprising:

a step of in response to operation of the display instructing operator associated with one of the operator groups, causing said display device to display a screen corresponding to the one operator group irrespective of whether the interlocking information indicates said interlocking function is valid or invalid for the one operator group.

9. A computer-readable medium for storing a computer program containing a group of instructions to cause a computer to perform the method as recited in claim 5.

* * * * *

UNITED STATES PATENT AND TRADEMARK OFFICE
Certificate

Patent No. 7,350,156 B2                                                            Patented: March 25, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Naohide Kohyama, Hamamatsu (JP); and Hiroshi Hamamatsu, Hamamatsu (JP).

Signed and Sealed this Twenty-first Day of September 2010.

<div style="text-align:right">
Kieu Vu<br>
<i>Supervisory Patent Examiner</i><br>
Art Unit 2173<br>
Technology Center 2100
</div>